US008767826B2

(12) United States Patent
Yu

(10) Patent No.: US 8,767,826 B2
(45) Date of Patent: *Jul. 1, 2014

(54) LUMA AND CHROMA ENCODING USING A COMMON PREDICTOR

(75) Inventor: Haoping Yu, Carmel, IN (US)

(73) Assignee: Thomson Licensing, Boulgne-Billancourt (FR)

( * ) Notice: Subject to any disclaimer, the term of this patent is extended or adjusted under 35 U.S.C. 154(b) by 1419 days.

This patent is subject to a terminal disclaimer.

(21) Appl. No.: 11/918,097

(22) PCT Filed: Mar. 16, 2006

(86) PCT No.: PCT/US2006/009429
§ 371 (c)(1),
(2), (4) Date: Oct. 9, 2007

(87) PCT Pub. No.: WO2006/112997
PCT Pub. Date: Oct. 26, 2006

(65) Prior Publication Data
US 2009/0052539 A1 Feb. 26, 2009

Related U.S. Application Data

(60) Provisional application No. 60/671,255, filed on Apr. 13, 2005, provisional application No. 60/700,834, filed on Jul. 20, 2005.

(51) Int. Cl.
*H04N 7/12* (2006.01)

(52) U.S. Cl.
USPC ................ 375/240.12; 375/240.26

(58) Field of Classification Search
USPC ............. 375/240–241; 382/232–254
See application file for complete search history.

(56) References Cited

U.S. PATENT DOCUMENTS

| 4,125,856 A | 11/1978 | Netravali et al. |
| 5,617,334 A | 4/1997 | Tseng et al. |

(Continued)

FOREIGN PATENT DOCUMENTS

| CN | 1535027 A | 10/2004 |
| CN | 1578477 A | 2/2005 |

(Continued)

OTHER PUBLICATIONS

Kim, W-S, et. al., "Inter-plane Prediction for RGB Coding," Joint Video Team (JVT) of ISO/IEC MPEG & ITU-T VCEG (ISO/IEC JTC1/SG29/WG11 and ITU-T SG16 Q6), Jul. 22, 2003, pp. 1-10, XP002291150.

(Continued)

*Primary Examiner* — Pao Sinkantarakorn
(74) *Attorney, Agent, or Firm* — Robert D. Shedd; Vincent E. Duffy; Palak Bhakta

(57) ABSTRACT

There are provided video encoders, video decoders, and corresponding methods. A video encoder for encoding video signal data for an image block includes an encoder for encoding all color components of the video signal data using a common predictor. A video decoder for decoding video signal data for an image block includes a decoder for decoding all color components of the video signal data using a common predictor. Additionally, an apparatus and method for encoding and decoding signal data for an image block includes an encoder and decoder for encoding/decoding color components of the video signal data without applying a residual color transform thereto. Furthermore, a video encoder and decoder for encoding/decoding video signal data for an image block includes an encoder and decoder for encoding/decoding the video signal data using unique predictors for each of color components of the video signal data.

18 Claims, 18 Drawing Sheets

(56) References Cited

U.S. PATENT DOCUMENTS

| | | | |
|---|---|---|---|
| 5,724,450 | A | 3/1998 | Chen et al. |
| 6,075,899 | A | 6/2000 | Yoshioka et al. |
| 6,618,443 | B1 * | 9/2003 | Kim et al. ............... 375/240.21 |
| 7,535,961 | B2 | 5/2009 | Cho et al. |
| 7,738,697 | B2 * | 6/2010 | Kim et al. ................. 382/167 |
| 2005/0013363 | A1 | 1/2005 | Cho et al. |
| 2005/0100230 | A1 * | 5/2005 | Moore ....................... 382/232 |
| 2005/0271288 | A1 | 12/2005 | Suzuki et al. |

FOREIGN PATENT DOCUMENTS

| | | |
|---|---|---|
| CN | 101160972 | 4/2008 |
| JP | 50-11321 | 2/1975 |
| JP | 63-76685 | 4/1988 |
| JP | 6-113326 | 4/1994 |
| JP | 9186883 | 7/1997 |
| JP | 1188909 A2 | 3/1999 |
| JP | 2002335407 A2 | 11/2002 |
| JP | 2004213100 | 7/2004 |
| JP | 2005-39743 A | 2/2005 |
| JP | 2005-39842 A | 2/2005 |

OTHER PUBLICATIONS

Sullivan, G. J., et. al., "The H.264/AVC advanced video coding standard: overview and introduction to the fidelity range extensions," Proceedings of the SPIE, SPIE, Bellingham, VA, vo. 5558, Nov. 2004, pp. 454-474, XP002340590.

Sullivan, Gary, et. al., "Draft Text of H.264/AVC Fidelity Range Extensions Amendment, Document JVT-L047d2," Joint Video Team (JVT) of ISO/IEC MPEG & ITU-T VCEG (ISO/IEC JTC1/SC29/WG11 and ITU-T SG16 Q.6), 12 Meeting Jul. 17-23, 2004, Redmond, WA, pp. 1-110, XP002390664.

Woo-Shik Kim, et. al., "Adaptive Residue Transform and Sampling, Document JVT-K018," Joint Video Team (JVT) of ISO/IEC MPEG & ITU-T VCEG (ISO/IEC JTC1/SC29/WG11 and ITU-T SG16 Q.6), 11th JVT Meeting Mar. 15-19, 2004, Munich, pp. 1-16, XP002390617.

Woo-Shik, Kim, et. al., "Proposal for the unsolved issues in Professional Extensions II, Document JVT-J018," Joint Video Team (JVT) of ISO/IEC MPEG & ITU-VCEG (ISO/IEC JTC1/SC29/WG11 and ITU-T SG16 Q.6), 10th JVT Meeting Dec. 8-12, 2003, Hawaii, pp. 1-11, XP002390616.

International Search Report dated Aug. 9, 2006.

Yu, Draft Text of H.264 / AVC Amendment 2, Joint Video Team (JVT) of ISO/IEC MPEG & ITU-T VCEG, 17th Meeting, Nice, FR, Oct. 14-21, 2005.

Yu, Joint 4:4:4: Video Model (JFVM), Joint Video Team (JVT) of ISO/IEC MPEG & ITU-T VCEG, 17th Meeting, Nice, FR, Oct. 14-21, 2005.

Yu, Performance Improved 4:4:4 Coding for MPEG-4Part10/H.264, Joint Video Team (JVT) of ISO/IEC MPEG & ITU-T VCEG, 15th Meeting, Busan, KR, Apr. 16-22, 2005.

Yu, Advanced 4:4:4: Profile for MPEG4-Part10/H264, Joint Video Team (JVT) of ISO/IEC MPEG & ITU-T VCEG, 16th Meeting, Poznan, PL, Jul. 24-29, 2005.

* cited by examiner

| seq_parameter_set_rbsp( ) { | C | Descriptor |
|---|---|---|
| profile_idc | 0 | u(8) |
| constraint_set0_flag | 0 | u(1) |
| constraint_set1_flag | 0 | u(1) |
| constraint_set2_flag | 0 | u(1) |
| constraint_set3_flag | 0 | u(1) |
| reserved_zero_4bits /* equal to 0 */ | 0 | u(4) |
| level_idc | 0 | u(8) |
| seq_parameter_set_id | 0 | ue(v) |
| if( profile_idc == 100 \|\| profile_idc == 110 \|\|    profile_idc == 122 \|\| profile_idc == 166 \|\| profile_idc == 188) { | | |
|   chroma_format_idc | 0 | ue(v) |
|     bit_depth_luma_minus8 | 0 | ue(v) |

FIG. 13

| FIG. 13A |
|---|
| FIG. 13B |
| FIG. 13C |
| FIG. 13D |

FIG. 13A

| Residual( ) { | C | Descriptor |
|---|---|---|
| if( !entropy_coding_mode_flag ) | | |
|    residual_block = residual_block_cavlc | | |
| else | | |
|    residual_block = residual_block_cabac | | |
| if( MbPartPredMode( mb_type, 0 ) == Intra_16x16 ) | | |
|    residual_block( Intra16x16DCLevel, 16 ) | 3 | |
| for( i8x8 = 0; i8x8 < 4; i8x8++ ) /* each luma 8x8 block */ | | |
|    if( !transform_size_8x8_flag \|\| !entropy_coding_mode_flag ) | | |
|      for( i4x4 = 0; i4x4 < 4; i4x4++ ) { /* each 4x4 sub-block of block */ | | |
|        if( CodedBlockPatternLuma & ( 1 << i8x8 ) ) | | |
|          if( MbPartPredMode( mb_type, 0 ) == Intra_16x16 ) | | |
|            residual_block( Intra16x16ACLevel[ i8x8 * 4 + i4x4 ], 15 ) | 3 | |
|          else | | |
|            residual_block( LumaLevel[ i8x8 * 4 + i4x4 ], 16 ) | 3\|4 | |
|        else if( MbPartPredMode( mb_type, 0 ) == Intra_16x16 ) | | |
|          for( i = 0; i < 15; i++ ) | | |
|            Intra16x16ACLevel[ i8x8 * 4 + i4x4 ][ i ] = 0 | | |
|        else | | |
|          for( i = 0; i < 16; i++ ) | | |
|            LumaLevel[ i8x8 * 4 + i4x4 ][ i ] = 0 | | |
|        if( !entropy_coding_mode_flag && transform_size_8x8_flag ) | | |
|          for( i = 0; i < 16; i++ ) | | |
|            LumaLevel8x8[ i8x8 ][ 4 * i + i4x4 ] = <br>                 LumaLevel[ i8x8 * 4 + i4x4 ][ i ] | | |
|    } | | |

FIG. 13B

| | | |
|---|---|---|
| else if( CodedBlockPatternLuma & ( 1 << i8x8 ) ) | | |
|     residual_block( LumaLevel8x8[ i8x8 ], 64 ) | 3 \| 4 | |
| else | | |
|     for( i = 0; i < 64; i++ ) | | |
|         LumaLevel8x8[ i8x8 ][ i ] = 0 | | |
| if( chroma_format_idc == 1 \|\| chroma_format_idc == 2 ) { | | |
|     NumC8x8 = 4 / ( SubWidthC * SubHeightC ) | | |
|     for( iCbCr = 0; iCbCr < 2; iCbCr++ ) | | |
|         if( CodedBlockPatternChroma & 3 ) /* chroma DC residual present*/ | | |
|             residual_block( ChromaDCLevel[ iCbCr ], 4 * NumC8x8 ) | 3 \| 4 | |
|         else | | |
|             for( i = 0; i < 4 * NumC8x8; i++ ) | | |
|                 ChromaDCLevel[ iCbCr ][ i ] = 0 | | |
|     for( iCbCr = 0; iCbCr < 2; iCbCr++ ) | | |
|         for( i8x8 = 0; i8x8 < NumC8x8; i8x8++ ) | | |
|             for( i4x4 = 0; i4x4 < 4; i4x4++ ) | | |
|                 if( CodedBlockPatternChroma & 2 )<br>                      /* chroma AC residual present */ | | |
|                 residual_block( ChromaACLevel[ iCbCr ][ i8x8*4+i4x4 ],15) | 3 \| 4 | |
|             else | | |
|                 for( i = 0; i < 15; i++) | | |
|                     ChromaACLevel[ iCbCr ][ i8x8*4+i4x4 ][ i ] = 0 | | |
| } else if (chroma_format_idc == 3) { | | |
|     if( MbPartPredMode( mb_type, 0 ) == Intra_16x16 ) /*Cb for 4:4:4*/ | | |
|         residual_block( CbIntra16x16DCLevel, 16 ) | 3 | |
|     for( i8x8 = 0; i8x8 < 4; i8x8++ ) /* each Cb 8x8 block */ | | |
|         if( !transform_size_8x8_flag \|\| !entropy_coding_mode_flag ) | | |
|             for( i4x4 = 0; i4x4 < 4; i4x4++ ) { /* each 4x4 sub-block of block */ | | |
|                 if( CodedBlockPatternLuma & ( 1 << i8x8 ) ) | | |

FIG. 13C

| | | |
|---|---|---|
| if( MbPartPredMode( mb_type, 0 ) = = Intra_16x16 ) | | |
|     residual_block(CbIntra16x16ACLevel[i8x8*4+i4x4],15) | 3 | |
| else | | |
|     residual_block( CbLevel[ i8x8 * 4 + i4x4 ], 16) | 3 \| 4 | |
| else if( MbPartPredMode( mb_type, 0 ) = = Intra_16x16 ) | | |
|     for( i = 0; i < 15; i++) | | |
|         CbIntra16x16ACLevel[ i8x8 * 4 + i4x4 ][ i ] = 0 | | |
| else | | |
|     for( i = 0; i < 16; i++) | | |
|         CbLevel[ i8x8 * 4 + i4x4 ][ i ] = 0 | | |
| if( !entropy_coding_mode_flag && transform_size_8x8_flag ) | | |
|     for( i = 0; i < 16; i++) | | |
|         CbLevel8x8[ i8x8 ][ 4 * i + i4x4 ] =<br>        CbLevel[ i8x8 * 4 + i4x4 ][ i ] | | |
|    } | | |
| else if( CodedBlockPatternLuma & ( 1 << i8x8 ) ) | | |
|     residual_block( CbLevel8x8[ i8x8 ], 64 ) | 3 \| 4 | |
| else | | |
|     for( i = 0; i < 64; i++) | | |
|         CbLevel8x8[ i8x8 ][ i ] = 0 | | |
| if( MbPartPredMode( mb_type, 0 ) = = Intra_16x16 ) /*Cr for 4:4:4 */ | | |
|     residual_block( CrIntra16x16DCLevel, 16 ) | 3 | |
| for( i8x8 = 0; i8x8 < 4; i8x8++ )  /* each Cr 8x8 block */ | | |
|     if( !transform_size_8x8_flag \|\| !entropy_coding_mode_flag ) | | |
|         for( i4x4 = 0; i4x4 < 4; i4x4++ ) { /* each 4x4 sub-block of block */ | | |
|         if( CodedBlockPatternLuma & ( 1 << i8x8 ) ) | | |
|             if( MbPartPredMode( mb_type, 0 ) = = Intra_16x16 ) | | |
|                 residual_block(CrIntra16x16ACLevel[i8x8*4+i4x4],15) | 3 | |
|             else | | |

FIG. 13D

| | | |
|---|---|---|
| residual_block( CrLevel[ i8x8 * 4 + i4x4 ], 16 ) | 3\|4 | |
| else if( MbPartPredMode( mb_type, 0 ) == Intra_16x16 ) | | |
| for( i = 0; i < 15; i++ ) | | |
| CrIntra16x16ACLevel[ i8x8 * 4 + i4x4 ][ i ] = 0 | | |
| else | | |
| for( i = 0; i < 16; i++ ) | | |
| CrLevel[ i8x8 * 4 + i4x4 ][ i ] = 0 | | |
| if( !entropy_coding_mode_flag && transform_size_8x8_flag ) | | |
| for( i = 0; i < 16; i++ ) | | |
| CrLevel8x8[ i8x8 ][ 4 * i + i4x4 ] = CrLevel[ i8x8 * 4 + i4x4 ][ i ] | | |
| } | | |
| else if( CodedBlockPatternLuma & ( 1 << i8x8 ) ) | | |
| residual_block( CrLevel8x8[ i8x8 ], 64 ) | 3\|4 | |
| else | | |
| for( i = 0; i < 64; i++ ) | | |
| CrLevel8x8[ i8x8 ][ i ] = 0 | | |
| } | | |

FIG. 16

| FIG. 16A |
|----------|
| FIG. 16B |

1600      FIG. 16A

| mb_pred( mb_type ) { | C | Descriptor |
|---|---|---|
| if( MbPartPredMode( mb_type, 0 ) == Intra_4x4 \|\|<br>    MbPartPredMode( mb_type, 0 ) == Intra_8x8 \|\|<br>    MbPartPredMode( mb_type, 0 ) == Intra_16x16 ) { | | |
| if (profile_idc != 166) { | | |
| if( MbPartPredMode( mb_type, 0 ) == Intra_4x4 ) | | |
| for( luma4x4BlkIdx=0; luma4x4BlkIdx<16; luma4x4BlkIdx++ ) { | | |
| prev_intra4x4_pred_mode_flag[ luma4x4BlkIdx ] | 2 | u(1) \| ae(v) |
| if( !prev_intra4x4_pred_mode_flag[ luma4x4BlkIdx ] ) | | |
| rem_intra4x4_pred_mode[ luma4x4BlkIdx ] | 2 | u(3) \| ae(v) |
| } | | |
| if( MbPartPredMode( mb_type, 0 ) == Intra_8x8 ) | | |
| for( luma8x8BlkIdx=0; luma8x8BlkIdx<4; luma8x8BlkIdx++ ) { | | |
| prev_intra8x8_pred_mode_flag[ luma8x8BlkIdx ] | 2 | u(1) \| ae(v) |
| if( !prev_intra8x8_pred_mode_flag[ luma8x8BlkIdx ] ) | | |
| rem_intra8x8_pred_mode[ luma8x8BlkIdx ] | 2 | u(3) \| ae(v) |
| } | | |
| if( chroma_format_idc != 0 ) | | |
| intra_chroma_pred_mode | 2 | u(v) \| ae(v) |
| } else { | | |
| if( MbPartPredMode( mb_type, 0 ) == Intra_4x4 ) | | |
| for( luma4x4BlkIdx=0; luma4x4BlkIdx<16; luma4x4BlkIdx++ ) { | | |
| prev_intra4x4_pred_mode_flag0[luma4x4BlkIdx] | 2 | u(1) \| ae(v) |
| if( !prev_intra4x4_pred_mode_flag0[ luma4x4BlkIdx ] ) | | |
| rem_intra4x4_pred_mode0[luma4x4BlkIdx] | 2 | u(3) \| ae(v) |
| prev_intra4x4_pred_mode_flag1[luma4x4BlkIdx] | 2 | u(1) \| ae(v) |

FIG. 16B

| | | |
|---|---|---|
| if( !prev_intra4x4_pred_mode_flag1[ luma4x4BlkIdx ] ) | | |
| rem_intra4x4_pred_mode1[luma4x4BlkIdx ] | 2 | u(3) \| ae(v) |
| prev_intra4x4_pred_mode_flag2[luma4x4BlkIdx ] | 2 | u(1) \| ae(v) |
| if( !prev_intra4x4_pred_mode_flag2[ luma4x4BlkIdx ] ) | | |
| rem_intra4x4_pred_mode2[luma4x4BlkIdx ] | 2 | u(3) \| ae(v) |
| } | | |
| if( MbPartPredMode( mb_type, 0 ) == Intra_8x8 ) | | |
| for( luma8x8BlkIdx=0; luma8x8BlkIdx<4; luma8x8BlkIdx++ ) { | | |
| prev_intra8x8_pred_mode_flag0[luma8x8BlkIdx ] | 2 | u(1) \| ae(v) |
| if( !prev_intra8x8_pred_mode_flag0[ luma8x8BlkIdx ] ) | | |
| rem_intra8x8_pred_mode0[luma8x8BlkIdx ] | 2 | u(3) \| ae(v) |
| prev_intra8x8_pred_mode_flag1[luma8x8BlkIdx ] | 2 | u(1) \| ae(v) |
| if( !prev_intra8x8_pred_mode_flag1[ luma8x8BlkIdx ] ) | | |
| rem_intra8x8_pred_mode1[luma8x8BlkIdx ] | 2 | u(3) \| ae(v) |
| prev_intra8x8_pred_mode_flag2[luma8x8BlkIdx ] | 2 | u(1) \| ae(v) |
| if( !prev_intra8x8_pred_mode_flag2[ luma8x8BlkIdx ] ) | | |
| rem_intra8x8_pred_mode2[luma8x8BlkIdx ] | 2 | u(3) \| ae(v) |
| } | | |
| } | | |
| } else if( MbPartPredMode( mb_type, 0 ) != Direct ) { | | |
| …….. | | |

LUMA AND CHROMA ENCODING USING A COMMON PREDICTOR

CROSS-REFERENCE TO RELATED APPLICATIONS

This application claims the benefit, under 35 U.S.C. §365 of International Application PCT/US2005/009429 filed Mar. 16, 2006, which was published in accordance with PCT Article 21(2) on Oct. 26, 2006 in English and claims priority of U.S. Provisional patent application No. 60/671,255 filed Apr. 13, 2005 and U.S. Provisional patent application No. 60/700,834 filed Jul. 20, 2005.

FIELD OF THE INVENTION

The present invention relates generally to video encoders and decoders and, more particularly, to methods and apparatus for video encoding and decoding.

BACKGROUND OF THE INVENTION

Presently, the 4:4:4 format of the International Telecommunication Union, Telecommunication Sector (ITU-T) H.264 standard (hereinafter the "H.264 standard") only codes one of three channels as luma, with the other two channels being coded as chroma using less efficient tools. When an input to a codec is in the 4:4:4 format with full resolution in every input component, coding two out of the three input components with the less effective chroma coding algorithm results in the use of more bits in those two channels. This particular problem is more noticeable in intra frames. For example, the H.264 standard running in the Intra-Only mode is less efficient than JPEG2k for overall compression quality at 40 dB (PSNR) and above.

Accordingly, it would be desirable and highly advantageous to have methods and apparatus for video encoding and decoding that overcome the above-described disadvantages of the prior art.

SUMMARY OF THE INVENTION

These and other drawbacks and disadvantages of the prior art are addressed by the present invention, which is directed to methods and apparatus for video encoding and decoding.

According to an aspect of the present invention, there is provided an apparatus for encoding video signal data for an image block. The apparatus includes an encoder for encoding color components of the video signal data without applying a residual color transform thereto.

According to another aspect of the present invention, there is provided a method for encoding video signal data for an image block. The method includes encoding color components of the video signal data without applying a residual color transform thereto.

According to yet another aspect of the present invention, there is provided an apparatus for decoding video signal data for an image block. The apparatus includes a decoder for decoding color components of the video signal data without applying a residual color transform thereto.

According to still another aspect of the present invention, there is provided a method for decoding video signal data for an image block. The method includes decoding color components of the video signal data without applying a residual color transform thereto.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which:

FIG. 13 is a table illustrating H.264 residual data syntax in accordance with the present principles;

FIG. 16 is a table illustrating H.264 macroblock prediction syntax in accordance with the present principles.

DETAILED DESCRIPTION

Figure 1:
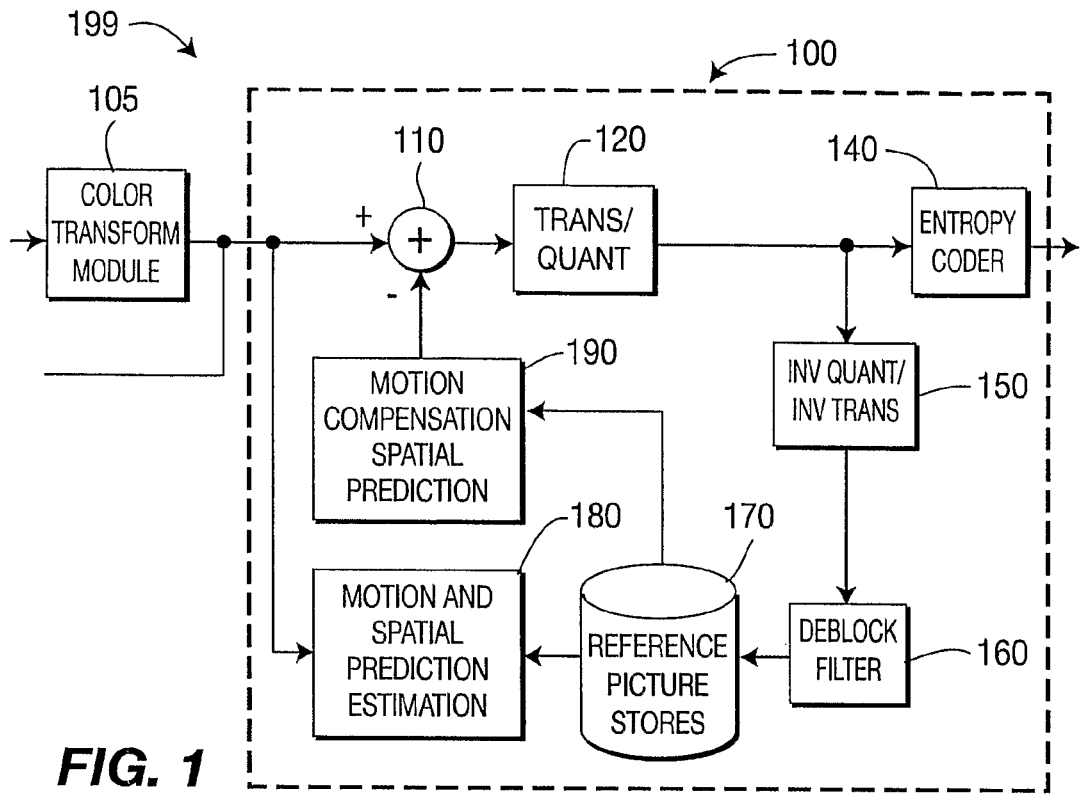
FIG. 1 is a block diagram illustrating an exemplary video encoding apparatus to which the present principles may be applied.

The present invention is directed to methods and apparatus for video encoding and decoding video signal data. It is to be appreciated that while the present invention is primarily described with respect to video signal data sampled using the 4:4:4 format of the International Telecommunication Union, Telecommunication Sector (ITU-T) H.264 standard, the present invention may also be applied to video signal data sampled using other formats (e.g., the 4:2:2 and/or 4:2:0 format) of the H.264 standard as well as other video compression standards while maintaining the scope of the present invention.

It is to be appreciated that methods and apparatus in accordance with the present, principles do not require use of any new tool(s) for the luma or chroma compression algorithm. Instead, the existing luma coding tools can be used. Accordingly, one advantageous result there from is that the coding performance of the 4:4:4 format may be maximized while preserving backward compatibility and minimizing any change to the existing H.264 (or other applicable) standard.

In accordance with the principles of the present invention as configured in an embodiment, a luma coding algorithm is used to code all three component channels of, e.g., 4:4:4 content. Advantages of this embodiment include an improvement in the overall coding performance for compressing 4:4:4 content with respect to the prior art. Presently, in the existing H.264 standard, only one of three channels is coded as luma, and the other two are coded as chroma using less efficient tools.

Further, in accordance with the principles of the present invention as configured in an embodiment, color transformation is performed as a pre-processing step. Thus, in accordance with this embodiment, a Residual Color Transform (RCT) is not performed inside the compression loop. Advantages of this embodiment include the providing of consistent encoder/decoder architecture among all color formats.

Moreover, in accordance with the principles of the present invention as configured in an embodiment, the same motion/spatial prediction mode is used for all three components. Advantages of this embodiment include reduced codec complexity and backwards compatibility.

Also, in accordance with another embodiment, instead of using the same predictor for all three components, a set (or subset) of three (3) restricted spatial predictors may be utilized for the three components. Advantages of this embodiment include an improvement in the overall coding performance for compressing 4:4:4 content with respect to the prior art.

It is to be appreciated that the various embodiments described above and subsequently herein may be implemented as stand alone embodiments or may be combined in any manner as readily appreciated by one of ordinary skill in this and related arts. Thus, for example, in a first combined embodiment, a luma coding algorithm is advantageously used to code all three component channels, color transformation is performed as a pre-processing step, and a single predictor is used for all three component channels. In a second combined embodiment, a luma coding algorithm is advantageously used to code all three component channels, color transformation is performed as a pre-processing step, and a set (or subset) of three (3) restricted spatial predictors may be utilized for the three component channels. Of course, as noted above, other combinations of the various embodiments may also be implemented given the teachings of the present principles provided herein while maintaining the scope of the present invention.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Turning to FIG. 1, an exemplary video encoding apparatus is indicated generally by the reference numeral 199. The video encoding apparatus 199 includes a video encoder 100 and a pre-encoding color transform module 105.

The pre-encoding color transform module 105 is for performing color pre-processing of video signals prior to inputting the same to the video encoder 100. The color pre-processing performed by the pre-encoding, color transform module 105 is further described herein below. It is to be appreciated that the pre-encoding, color transform module 105 may be omitted in some embodiments.

An input of the pre-encoding color transform module 105 and an input of the video encoder 100 are available as inputs of the video encoding apparatus 199.

An output of the pre-encoding, color transform module 105 is connected in signal communication with the input of the video encoder 100.

The input of the video encoder 100 is connected in signal communication with a non-inverting input of a summing junction 110. The output of the summing junction 110 is connected in signal communication with a transformer/quantizer 120. The output of the transformer/quantizer 120 is connected in signal communication with an entropy coder 140. An output of the entropy coder 140 is available as an output of the video encoder 100 and also as an output of the video encoding apparatus 199.

The output of the transformer/quantizer 120 is further connected in signal communication with an inverse transformer/quantizer 150. An output of the inverse transformer/quantizer 150 is connected in signal communication with an input of a deblock filter 160. An output of the deblock filter 160 is connected in signal communication with reference picture stores 170. A first output of the reference picture stores 170 is connected in signal communication with a first input of a motion and spatial prediction estimator 180. The input to the video encoder 100 is further connected in signal communication with a second input of the motion and spatial prediction estimator 180. The output of the motion and spatial prediction estimator 180 is connected in signal communication with a first input of a motion and spatial prediction compensator 190. A second output of the reference picture stores 170 is connected in signal communication with a second input of the motion and spatial compensator 190. The output of the motion and spatial compensator 190 is connected in signal communication with an inverting input of the summing junction 110.

Figure 2:
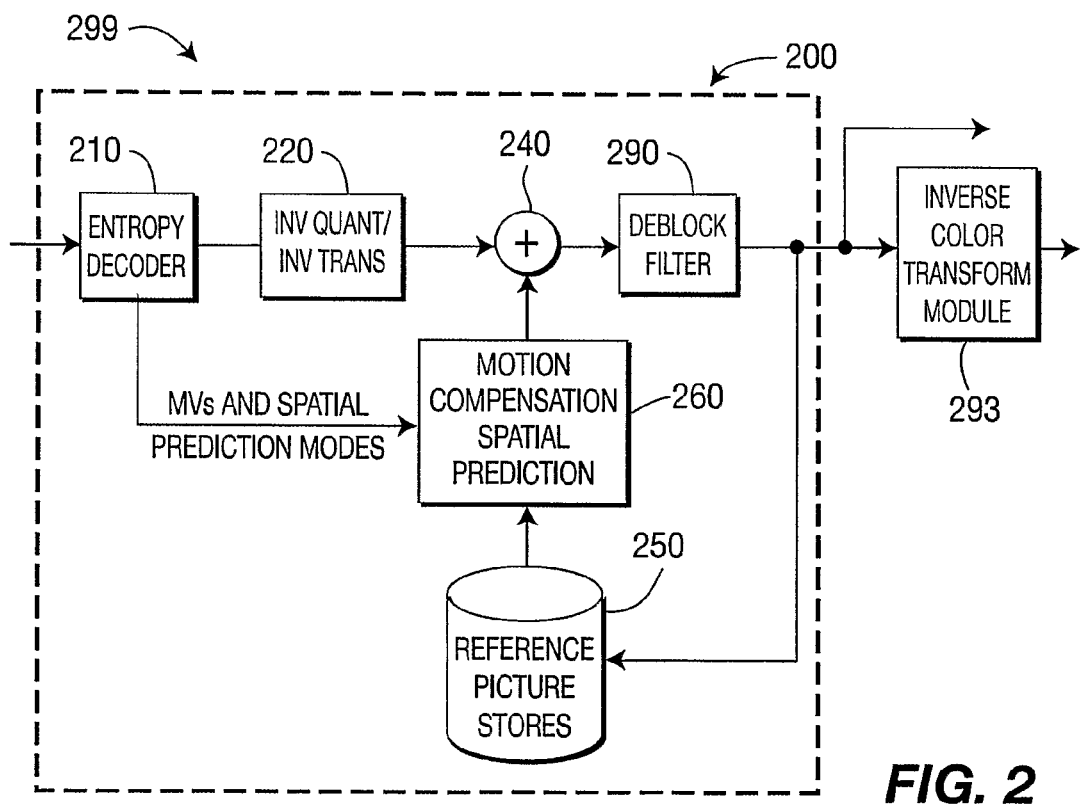
FIG. 2 is a block diagram illustrating an exemplary video decoding apparatus to which the present principles may be applied.

Turning to FIG. 2, an exemplary video decoding apparatus is indicated generally by the reference numeral 299. The video decoding apparatus 299 includes a video decoder 200 and a post-decoder, inverse color transform module 293.

An input of the video decoder 200 is available as an input of the video decoding apparatus 299. The input to the video decoder 200 is connected in signal communication with an input of the entropy decoder 210. A first output of the entropy decoder 210 is connected in signal communication with an input of an inverse quantizer/transformer 220. An output of the inverse quantizer/transformer 220 is connected in signal communication with a first input of a summing junction 240.

The output of the summing junction 240 is connected in signal communication with a deblock filter 290. An output of the deblock filter 290 is connected in signal communication with reference picture stores 250. The reference picture store 250 is connected in signal communication with a first input of a motion and spatial prediction compensator 260. An output of the motion spatial prediction compensator 260 is connected in signal communication with a second input of the summing junction 240. A second output of the entropy decoder 210 is connected in signal communication with a second input of the motion compensator 260. The output of the deblock filter 290 is available as an output of the video decoder 200 and also as an output of the video decoding apparatus 299.

Moreover, an output of the post-decoding, inverse color transform module 293 may be available as an output of the video decoding apparatus 299. In such a case, the output of the video decoder 200 may be connected in signal communication with an input of the post-decoding, inverse color transform module 293, which is a post-processing module with respect to the video decoder 200. An output of the post-decoding, inverse color transform module 293 provides a post-processed, inverse color transformed signal with respect to the output of the video decoder 200. It is to be appreciated that use of the post-decoding, inverse color transform module 293 is optional.

A description is now presented for enhanced 4:4:4 coding in accordance with the principles of the present invention. A first described embodiment is a combined embodiment in which the luma coding algorithm is used for all color components, the same spatial prediction mode is used for all color components, and the Residual Color Transform (RCT) is omitted from inside the compression loop. Test results for this combined embodiment are also provided. Subsequently thereafter, a second combined embodiment is described wherein the luma coding algorithm is used for all color components, a set (or subset) of restricted spatial predictors is used for all color components (instead of a single spatial prediction mode), and the Residual Color Transform (RCT) is omitted from inside the compression loop. Thus, a difference between the first and second combined embodiments is the use of a single spatial prediction mode for all color components in the first combined embodiment versus the use of a set (or subset) of restricted spatial predictors for all color components in the second combined embodiment. Of course, as noted above, the embodiments described herein may be implemented as stand alone embodiments or may be combined in any manner, as readily appreciated by one of ordinary skill in this and related arts. For example, in accordance with the principles of the present invention as configured in an embodiment, only a single spatial prediction mode is used, without combination with other embodiments such as the omission of RCT from the compression loop. It is to be appreciated that given the teachings of the present principles provided herein, these and other variations, implementations, and combinations of the embodiments of the present invention will be readily ascertainable by one of ordinary skill in this and related arts, while maintaining the scope of the present invention.

Figure 3:
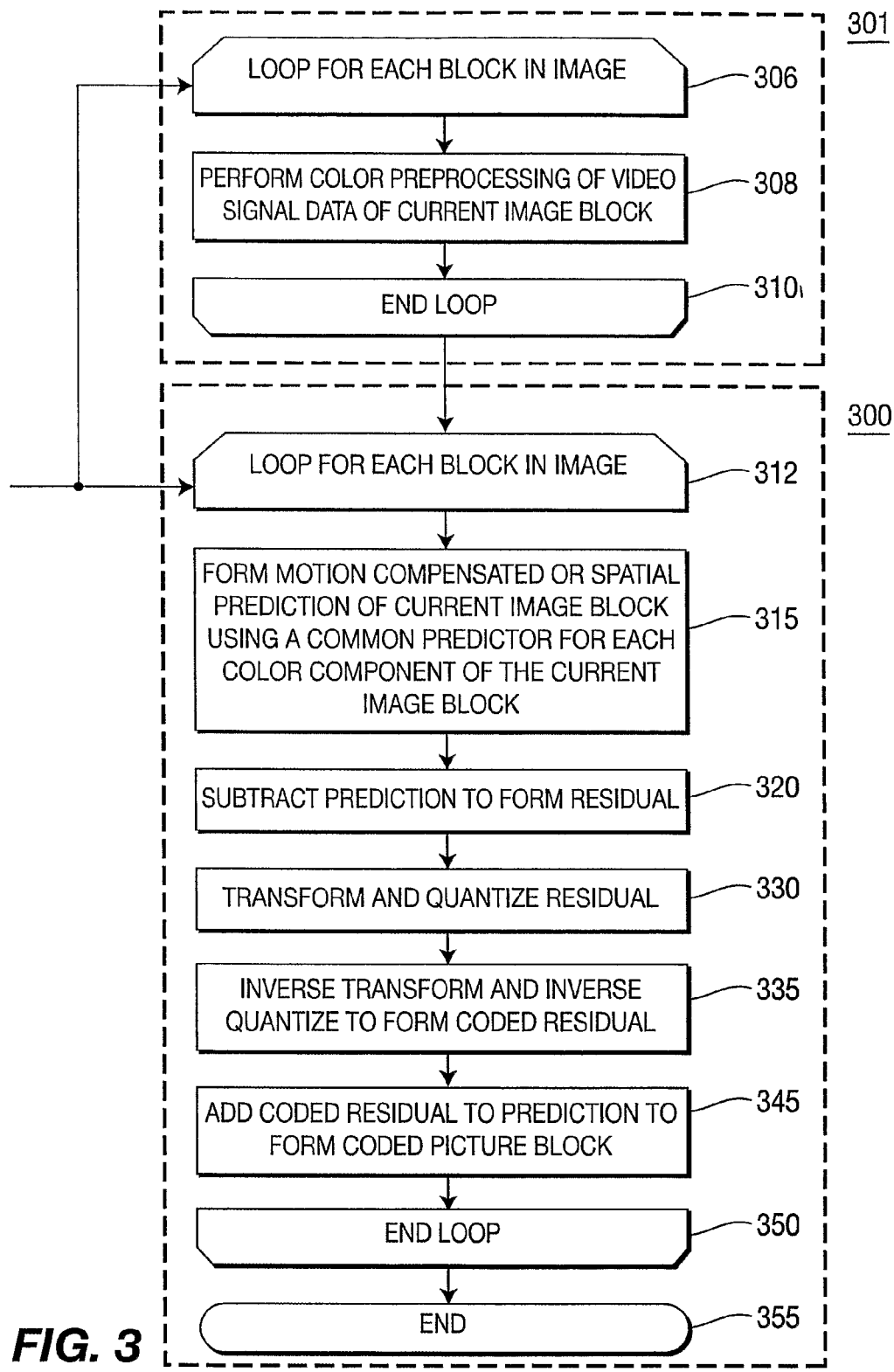
FIG. 3 is a flow diagram illustrating an exemplary video encoding process with a pre-encoding, color transform block, in accordance with the present principles.

Turning to FIG. 3, an exemplary video encoding process with a pre-encoding, color transform block, are indicated generally by the reference numerals 300 and 301, respectively.

It is to be appreciated that the pre-encoding, color transform block 301 includes blocks 306, 308, and 310. Moreover, it is to be appreciated that the pre-encoding, color transform block 301 is optional and, thus, may be omitted in some embodiments of the present invention.

The pre-encoding, color transform block 301 includes a loop limit block 306 that begins a loop for each block in an image, and passes control to a function block 308. The function block 308 performs color pre-processing of the video signal data of the current image block, and passes control to a loop limit block 310. The loop limit block 310 ends the loop. Moreover, the loop limit block 310 passes control to a loop limit block 312, the latter being included in the video encoding process 300.

The loop limit block 312 begins a loop for each block in the image, and passes control to a function block 315. The function block 315 forms a motion compensated or spatial prediction of the current image block using a common predictor for each color component of the current image block, and passes control to a function block 320. The function block 320 subtracts the motion compensated or spatial prediction from the current image block to form a prediction residual, and passes control to a function block 330. The function block 330 transforms and quantizes the prediction residual, and passes control to a function block 335. The function block 335 inverse transforms and quantizes the prediction residual to form a coded prediction residual, and passes control to a function block 345. The function block 345 adds the coded residual to the prediction to form a coded picture block, and passes control to an end loop block 350. The end loop block 350 ends the loop and passes control to an end block 355.

Figure 4:
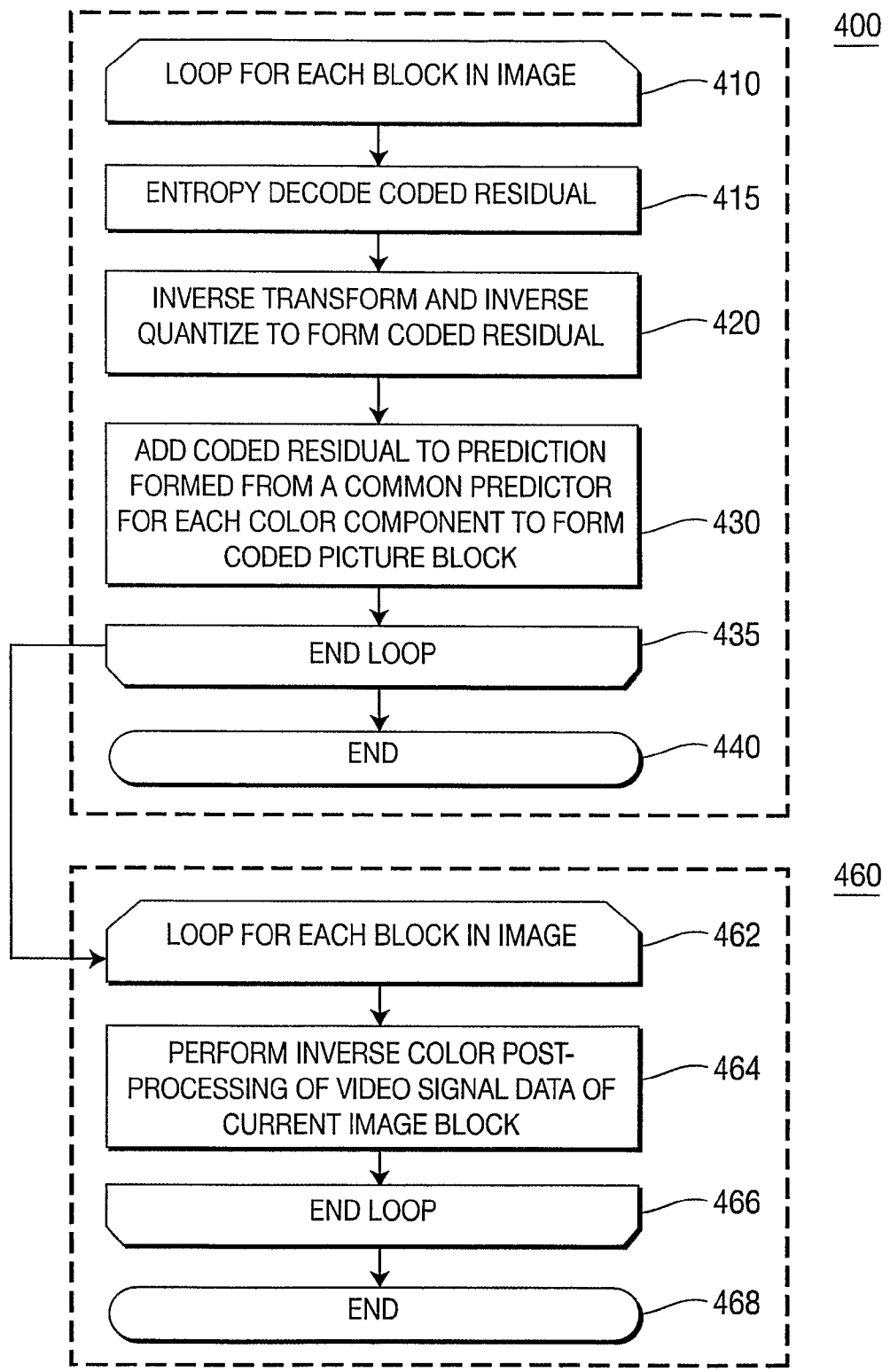
FIG. 4 is a flow diagram illustrating an exemplary video decoding process with a post-decoding, inverse color transform block, in accordance with the present principles.

Turning to FIG. 4, an exemplary video decoding process with a post-decoding, inverse color transform block, are indicated generally by the reference numerals 400 and 460, respectively.

It is to be appreciated that the post-decoding, inverse color transform block 460 includes blocks 462, 464, 466, and 468. Moreover, it is to be appreciated that the post-decoding, inverse color transform block 460 is optional and, thus, may be omitted in some embodiments of the present invention.

The decoding process 400 includes a loop limit block 410 that begins a loop for a current block in an image, and passes control to a function block 415. The function block 415 entropy decodes the coded residual, and passes control to a function block 420. The function block 420 inverse transforms and quantizes the decoded residual to form a coded residual, and passes control to a function block 430. The function block 430 adds the coded residual to the prediction formed from a common predictor for each color component to form a coded picture block, and passes control to a loop limit block 435. The loop limit block 435 ends the loop and passes control to an end block 440.

In some embodiments, the loop limit block 435 optionally passes control to the post-decoding, inverse color transform block 460, in particular, the loop limit block 462 included in the post-decoding, inverse color transform block 460. The loop limit block 462 begins a loop for each block in an image, and passes control to a function block 464. The function block 464 performs an inverse color post-processing of the video signal data of the current image block, and passes control to a loop limit block 466. The loop limit block 466 ends the loop, and passes control to an end block 468.

In the H.264 4:4:4 format, every component channel has full resolution. Thus, in accordance with the first combined embodiment set forth above, the luma coding algorithm is used on every color component to achieve the maximum overall compression efficiency. Accordingly, in the embodiment, for intra frames, every color component may be compressed, e.g., using those prediction modes listed in Table 8-2, Table 8-3, and Table 8-4 in ISO/IEC 14496 10 Advanced Video Coding 3$^{rd}$ Edition (ITU-T Rec. H.264), ISO/IEC JTC1/SC29/WG11 and ITU-T SG16 Q.6, Document N6540, July 2004.

In addition, in the embodiment, the same spatial prediction mode is used for all three pixel components, to further reduce the complexity of the codec and improve performance. For example, the prediction mode set by the prev_intra4×4_pred_mode_flag, rem_intra4×4_pred_mode, prev_intra8×8_pred_mode_flag, and rem_intra8×8_pred_mode parameters for the luma in the macroblock prediction header may be used by all three components. Therefore, no extra bits and syntax elements are needed. For the B and P (predictive) frames, the reference pixels at fractional pixel locations may be calculated by the interpolation methods described in Section 8.4.2.2.1 of the H.264 standard for all three channels. The detailed syntax and semantic changes to the current H.264 standard are further discussed herein below.

Residual Color Transform (RCT) was added to the encoder/decoder in the High 4:4:4 Profile. As a result, the compression structure for the 4:4:4 format is different from the one currently used in all of the other profiles in the H.264 standard for 4:2:0 and 4:2:2 formats. This results in some extra complexity to the implementation. Moreover, similar to any other color transforms, YCOCG does not always improve the overall compression performance. The effectiveness of YCOCG is highly content dependent. Thus, to improve the overall compression and robustness, in the embodiment, the color transform is placed outside of the prediction loop as a part of the preprocessing block. By doing this, selecting an optimum color transform for a specific compression task is an operational issue and the best answer for a particular input sequence could be found among a number of options. In accordance with an embodiment where all three components are using the same spatial predictors for the intra frames and the same interpolation filters for the B and P (predictive or inter-coded) frames, having the color transform performed on the prediction residues is identical to performing the color transform on the source images outside of the codec when the rounding/truncation errors are ignored. This will be discussed further herein below. Thus, the RCT block is removed from the coding structure to make the coding structure consistent among all of the color formats.

Figures 5, 12:
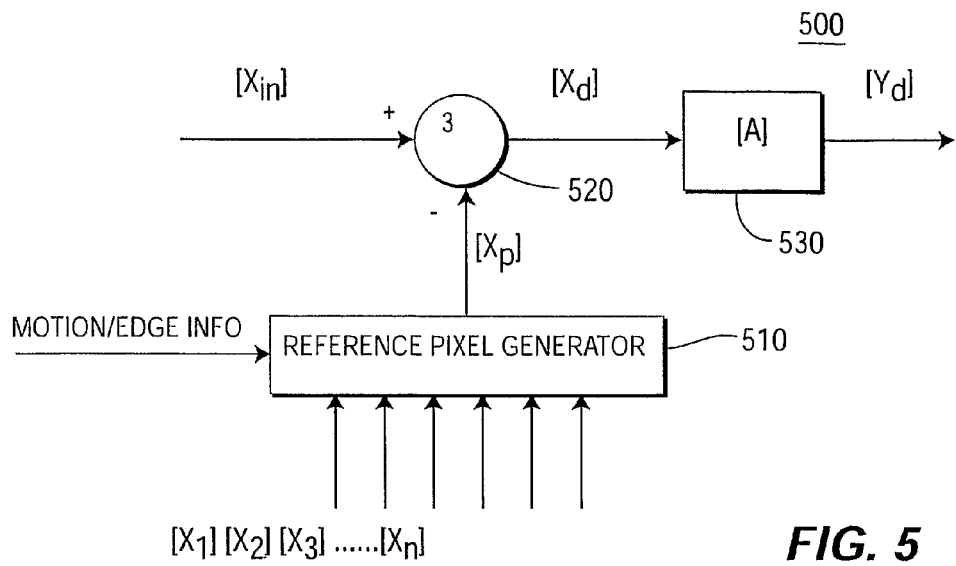
FIG. 5 is a block diagram illustrating a simplified model of residual color transform (RCT)
FIG. 12 is a table illustrating H.264 sequence parameter syntax in accordance with the present principles.

Turning to FIG. 5, a simplified model of RCT is indicated generally by the reference numeral 500. The RCT model 500 includes a reference pixel generator 510, a summing junction 520, and a linear transform module 530. Inputs to the reference pixel generator 510 are configured to receive motion/edge information and vectors $[X_1], [X_2]\ldots[X_n]$. An output of the reference pixel generator 510 is connected in signal communication with an inverting input of the summing junction 520, which provides prediction vector $[X_p]$ thereto. A non-inverting input of the summing junction 520 is configured to receive input vector $[X_{in}]$. An output of the summing junction 520 is connected in signal communication with an input of the linear transform module 530, which provides vector $[X_d]$ thereto. An output of the linear transform module 530 is configured to provide vector $[Y_d]$.

In the simplified model of RCT 500, the color transform represented by a 3×3 matrix [A] (a linear transform) is defined as follows:

$$\begin{bmatrix} Y \\ u \\ v \end{bmatrix} = [A] \begin{bmatrix} R \\ G \\ B \end{bmatrix} \quad (1)$$

The $[X_{in}], [X_d], [X_p], [X_1], [X_2]\ldots[X_n]$ are 3×1 vectors representing the pixels in the RGB domain. The $[Y_d]$ is a 3×1 vector representing the result of the color transform. Therefore, $$[Y_d]=[A][X_d]=[A][X_{in}]-[A][X_p] \quad (2)$$

Since, in the embodiment, the same spatial predictors and interpolation filters are used for all three components in a macroblock in accordance with the principles of the present invention as configured in an embodiment, the reference pixel $[X_p]$ can be expressed as follows:

$$[X_p] = [X_1 X_2 X_3 \ldots X_n] \begin{bmatrix} c_1 \\ c_2 \\ c_3 \\ \vdots \\ c_n \end{bmatrix} \quad (3)$$

$$= \begin{bmatrix} R_1 & R_2 & R_3 & \ldots & R_n \\ G_1 & G_2 & G_3 & \ldots & G_n \\ B_1 & B_2 & B_3 & \ldots & B_n \end{bmatrix} \begin{bmatrix} c_1 \\ c_2 \\ c_3 \\ \vdots \\ c_n \end{bmatrix},$$

where a n×1 vector [C] represents the linear operations involved in the spatial predictors and interpolation filters defined in the H.264 standard. Here, it is presumed that the reference pixel is calculated by using a total number of n neighboring pixels $[X_1], [X_2], \ldots [X_n]$.

Substituting [Xp] in equation (3) into equation (2) results in the following:

$$[Y_d] = [A][X_{in}] - [A] \left( \begin{bmatrix} R_1 & R_2 & R_3 & \ldots & R_n \\ G_1 & G_2 & G_3 & \ldots & G_n \\ B_1 & B_2 & B_3 & \ldots & B_n \end{bmatrix} \begin{bmatrix} c_1 \\ c_2 \\ c_3 \\ \vdots \\ c_n \end{bmatrix} \right). \quad (4)$$

Ignoring the rounding/truncation errors and assuming the same prediction mode is selected in either the RGB or Y domain results in the following:

$$[Y_d] = [A][X_{in}] - \left( [A] \begin{bmatrix} R_1 & R_2 & R_3 & \ldots & R_n \\ G_1 & G_2 & G_3 & \ldots & G_n \\ B_1 & B_2 & B_3 & \ldots & B_n \end{bmatrix} \right) \begin{bmatrix} c_1 \\ c_2 \\ c_3 \\ \vdots \\ c_n \end{bmatrix} \quad (5)$$

$$= [Y_{in}] - \begin{bmatrix} Y_1 & Y_2 & Y_3 & \ldots & Y_n \\ u_1 & u_2 & u_3 & \ldots & u_n \\ v_1 & v_2 & v_3 & \ldots & v_n \end{bmatrix} \begin{bmatrix} c_1 \\ c_2 \\ c_3 \\ \vdots \\ c_n \end{bmatrix}.$$

Therefore, $$[Y_d] = [Y_{in}] - [Y_1 Y_2 Y_3 \ldots Y_n] \begin{bmatrix} c_1 \\ c_2 \\ c_3 \\ \vdots \\ c_n \end{bmatrix}. \quad (6)$$

Thus, equation (6) clearly shows that using YUV as the input to the encoder/decoder in accordance with the principles of the present invention as configured in this embodiment, is identical to performing RCT.

Also, in accordance with the principles of the present invention as configured in an embodiment, a new 4:4:4 profile is added to the H.264 standard, referred to herein as "Advanced 4:4:4 Profile with profile_idc=166". This new profile_idc may be added in the sequence parameter header, and may be used in the macroblock layer header, as well as the residual data header.

To support using the luma algorithm to code all three color components, some changes may be made to the residual data syntax. In addition, changes may also be made to the semantics of some of the elements in the macroblock header, residue data header, and so forth. In general, the existing syntax for luma in the H.264 specification will remain unchanged and be used to code one of the three components. The changes are backward compatible. The detailed syntax and semantics changes are described herein below.

A description will now be given regarding simulation results performed in accordance with the principles of the present invention as configured in various embodiments.

Figure 6A:
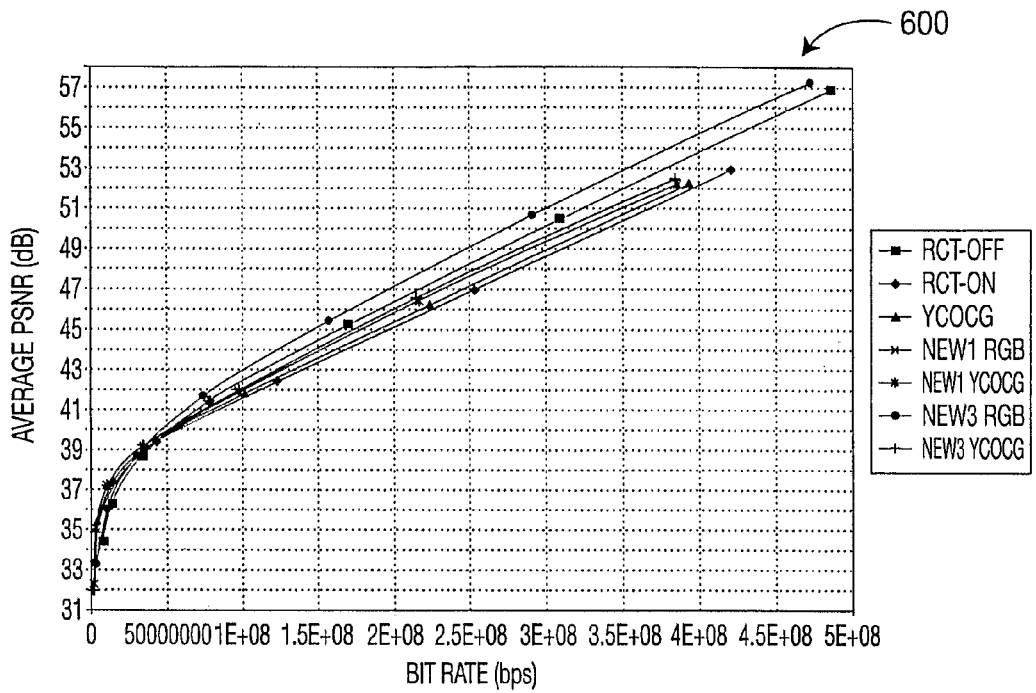
FIGS. 6A and 6B are plots of average PSNR verses bit rate for ATV intra-only in accordance with the present principles.
Figure 6B:
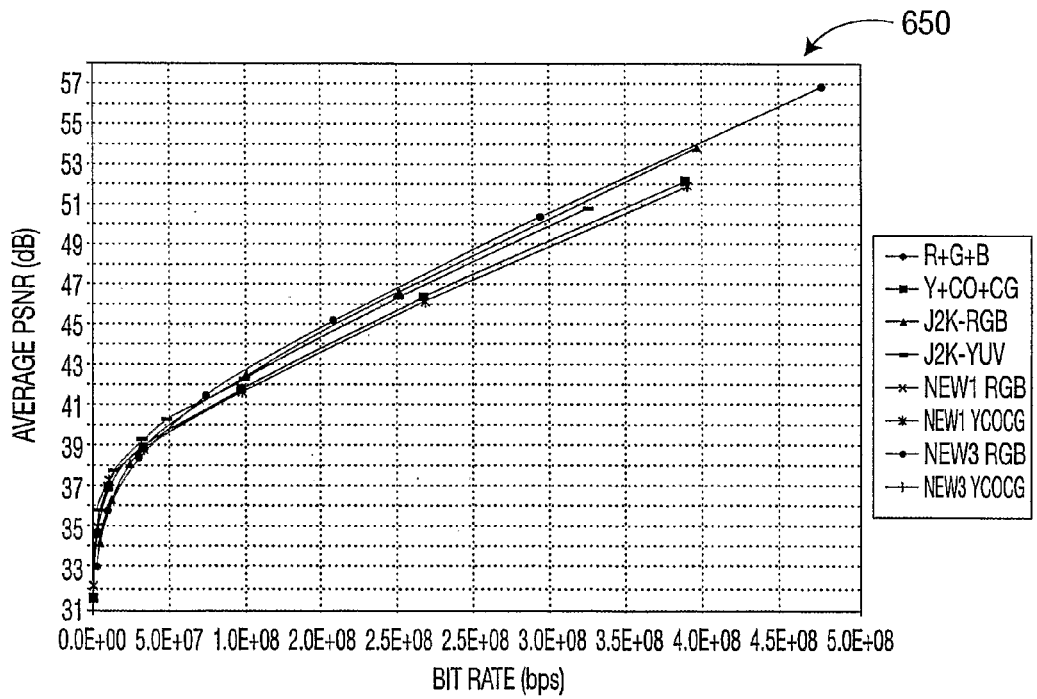

Turning to FIGS. 6A and 6B, plots of average PSNR verses bit rate for ATV intra-only are indicated generally by the reference numerals 600 and 650, respectively.

Figure 7A:
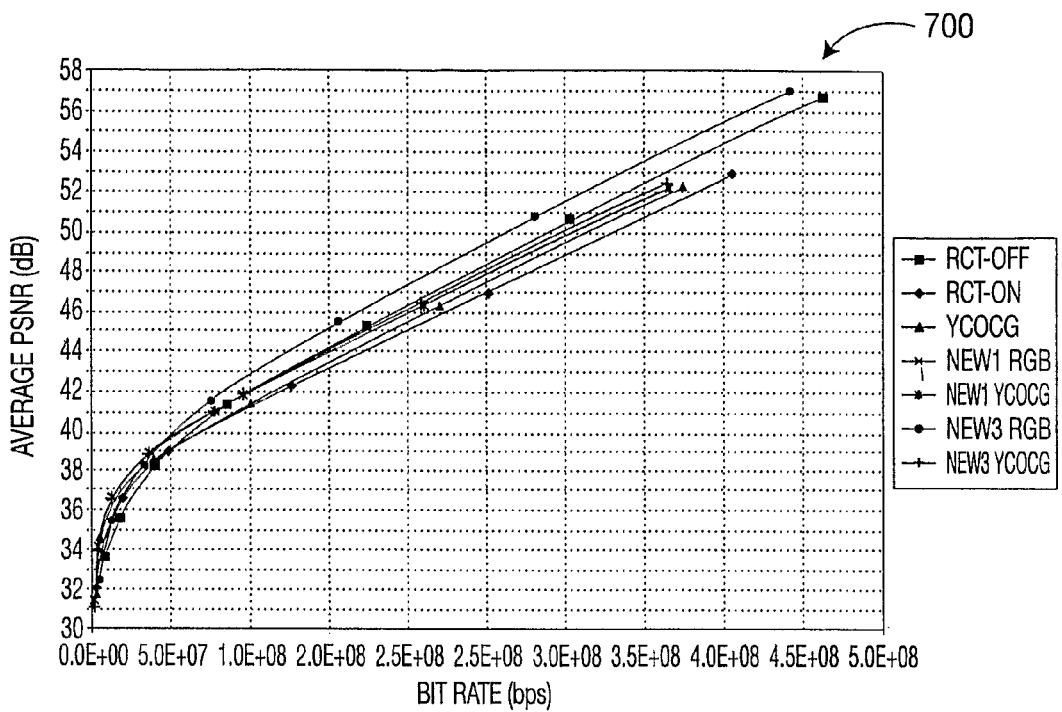
FIGS. 7A and 7B are plots of average PSNR verses bit rate for CT intra-only in accordance with the present principles.
Figure 7B:
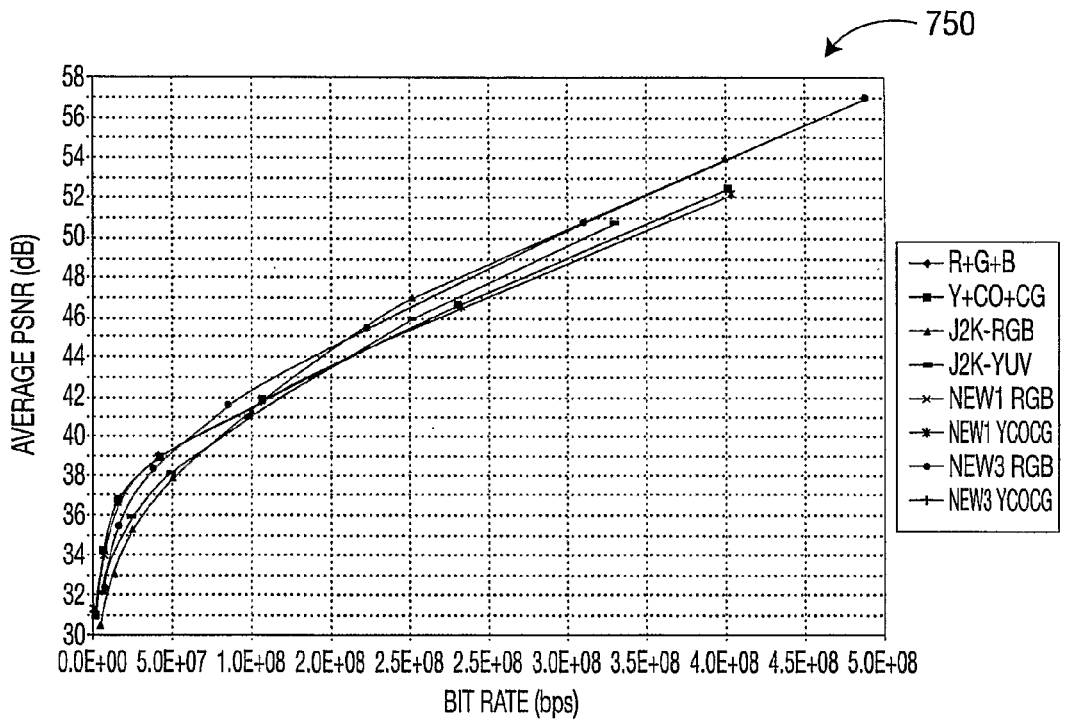

Turning to FIGS. 7A and 7B, plots of average PSNR verses bit rate for CT intra-only are indicated generally by the reference numerals 700 and 750, respectively.

Figure 8A:
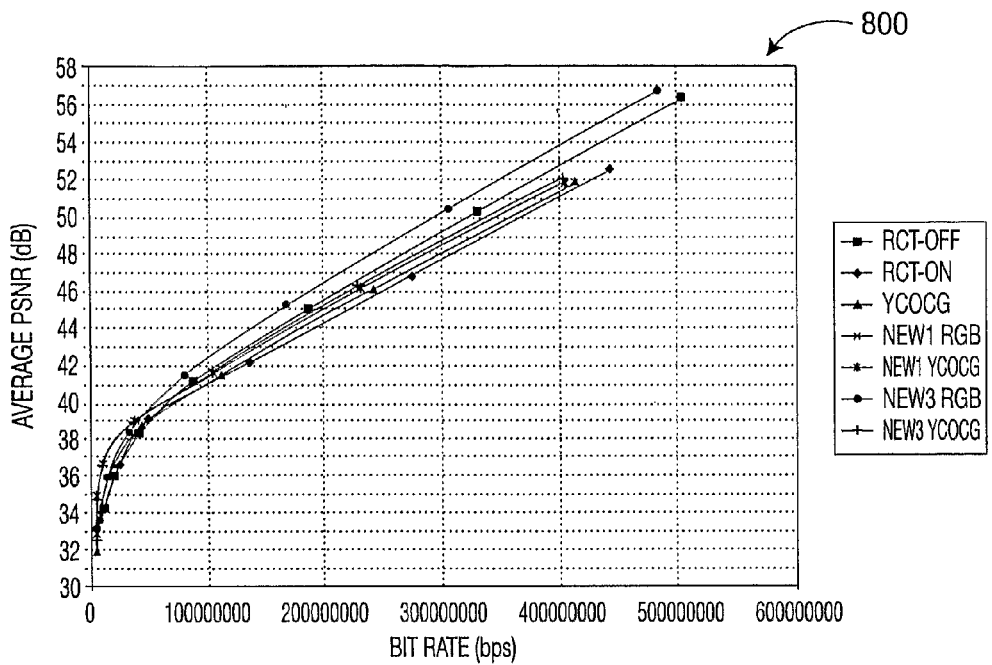
FIGS. 8A and 8B are plots of average PSNR verses bit rate for DT intra-only in accordance with the present principles.
Figure 8B:
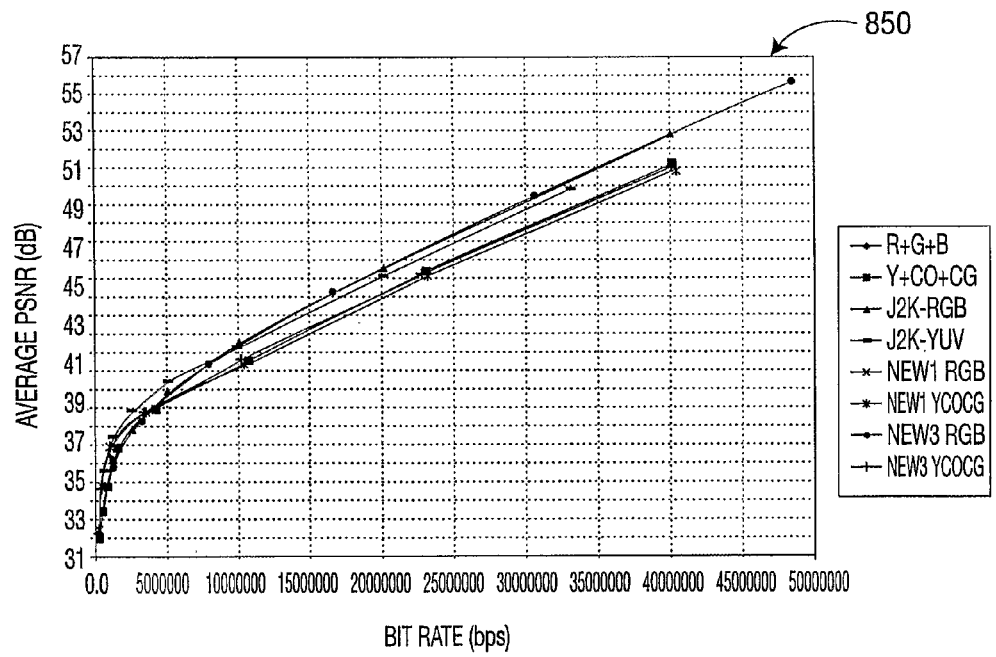

Turning to FIGS. 8A and 8B, plots of average PSNR verses bit rate for DT intra-only are indicated generally by the reference numerals 800 and 850.

Figure 9A:
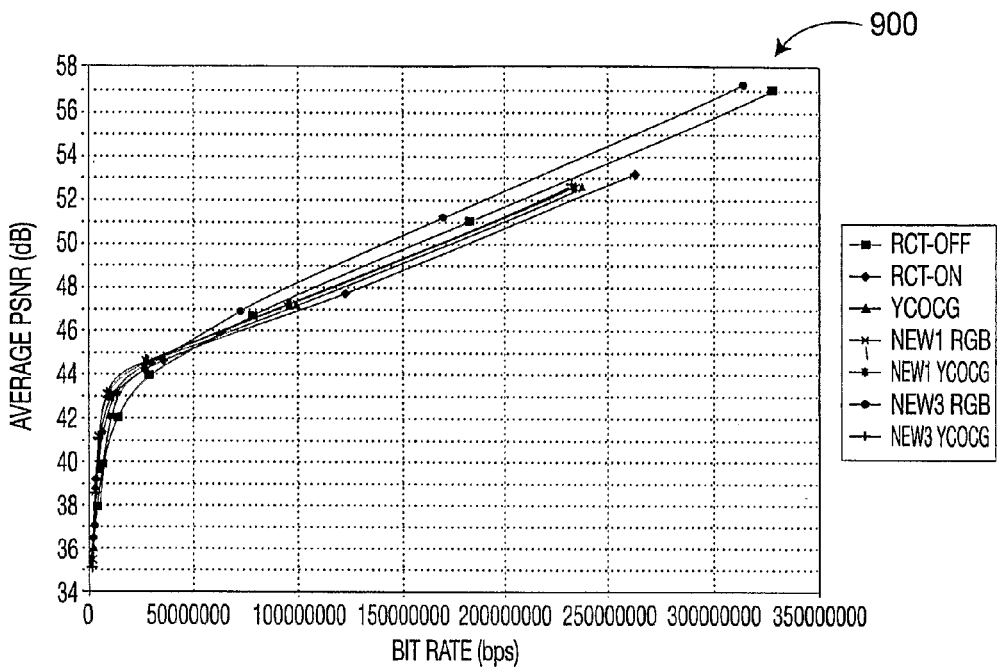
FIGS. 9A and 9B are plots of average PSNR verses bit rate for MIR_HD intra-only in accordance with the present principles.
Figure 9B:
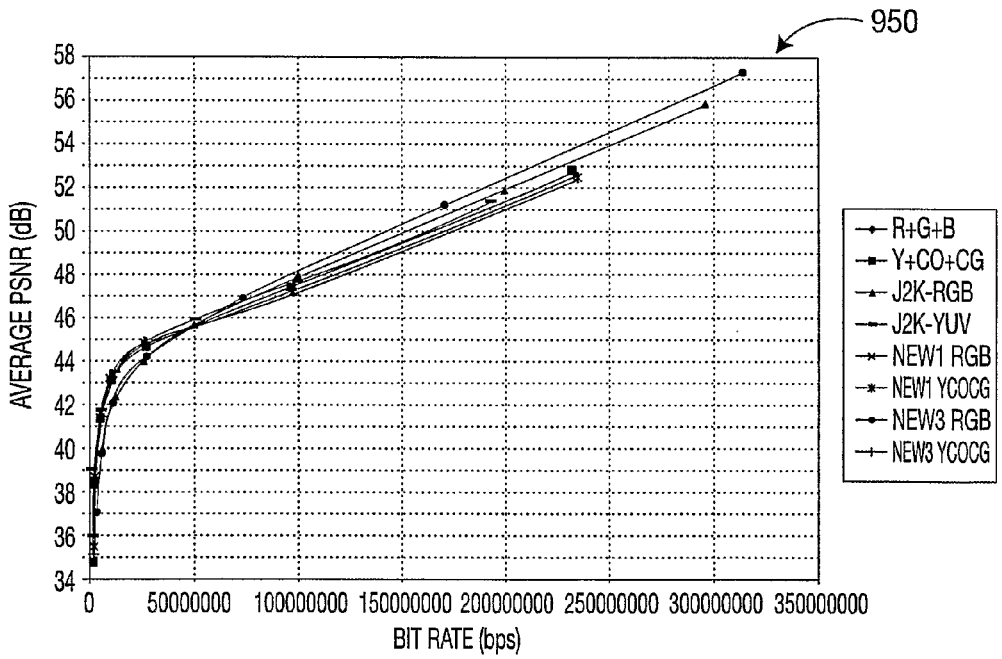

Turning to FIGS. 9A and 9B, plots of average PSNR verses bit rate for MIR_HD intra-only are indicated generally by the reference numerals 900 and 950, respectively.

Figure 10A:
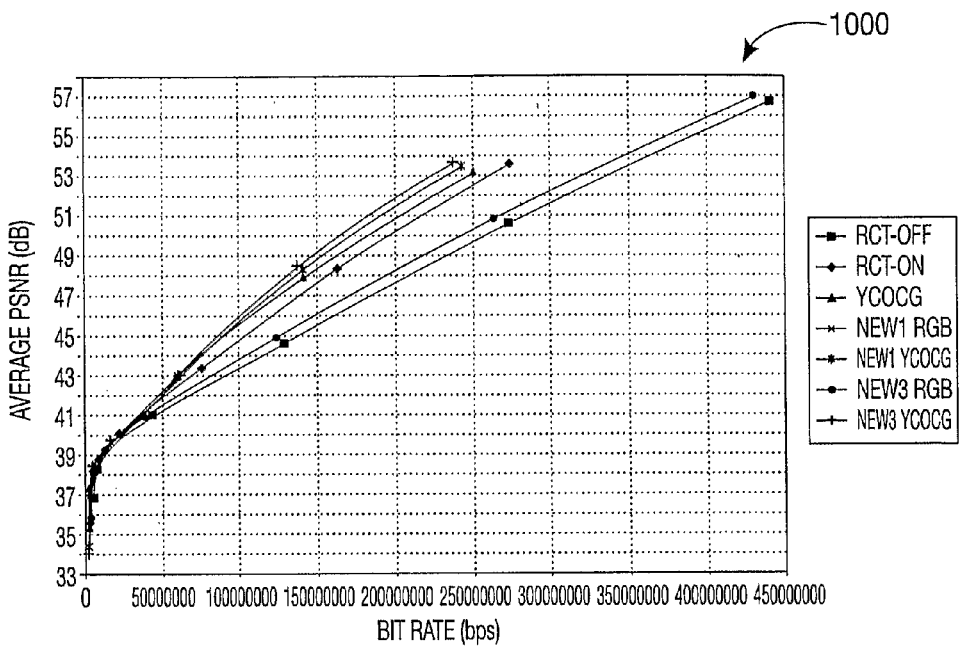
FIGS. 10A and 10B are plots of average PSNR verses bit rate for RT intra-only in accordance with the present principles.
Figure 10B:
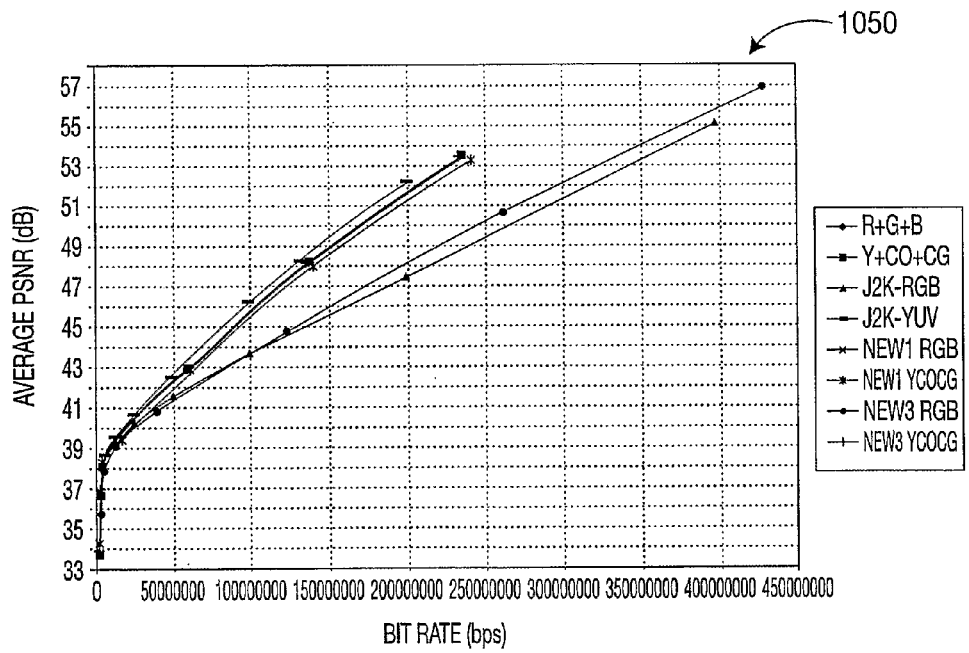

Turning to FIGS. 10A and 10B, plots of average PSNR verses bit rate for RT intra-only are indicated generally by the reference numerals 1000 and 1050, respectively.

Figure 11A:
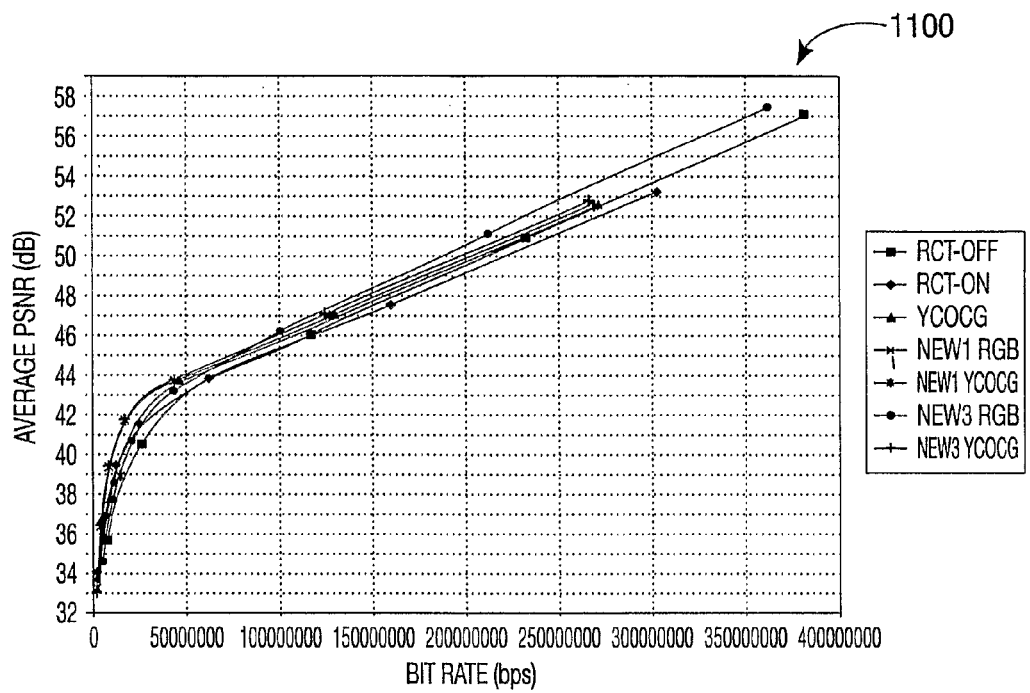
FIGS. 11A and 11B are plots of average PSNR verses bit rate for STB_HD intra-only in accordance with the present principles.
Figure 11B:
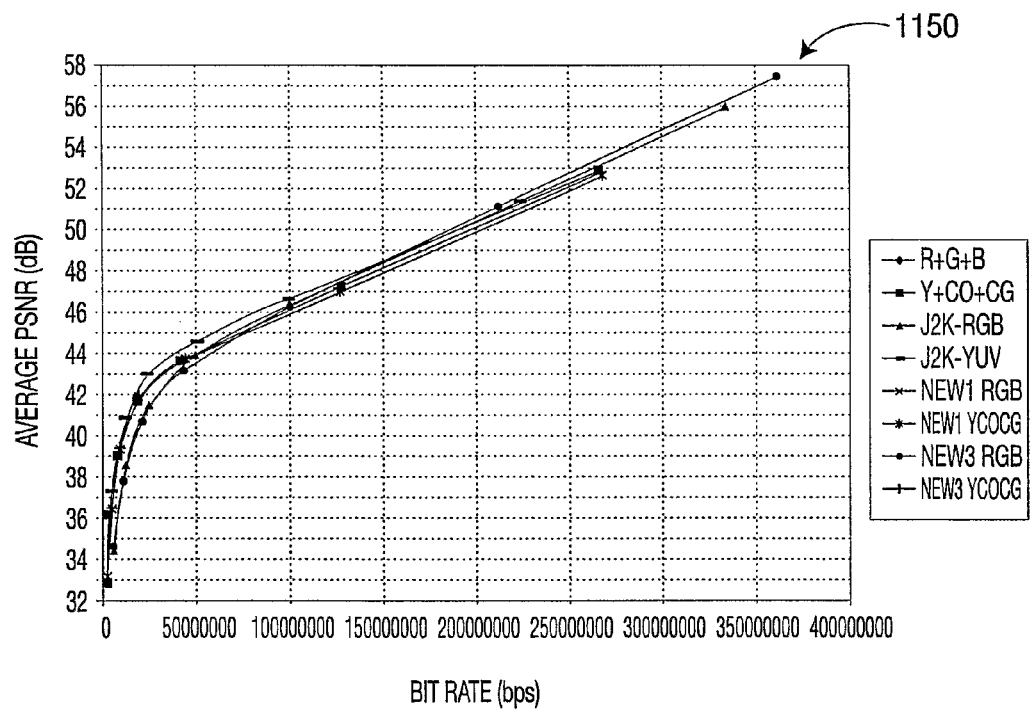

Turning to FIGS. 11A and 11B, plots of average PSNR verses bit rate for STB_HD intra-only are indicated generally by the reference numerals 1100 and 1150.

In particular, FIGS. 6A, 7A, 8A, 9A, 10, and 11A illustrate test results for the proposed Advanced 4:4:4 profile (indicated and preceded by the term "new") versus approximation results corresponding thereto. Moreover, FIGS. 6B, 7B, 8B, 9B, 10B, and 11B illustrate test results for the proposed Advanced 4:4:4 profile (indicated and preceded by the term "new") versus JPEK2k.

In all of FIGS. 6A, 6B through 11A, 11B, the PSNR is indicated in decibels (dB) and the bit rate is indicated in bits per second (bps). ATV, CT, DT, MIR, RT, STB are the names of the test clips.

All JVT/FRExt test sequences described in JVT-J042, Film-Originated Test Sequences, were used in the tests. They are all 4:4:4 10 bit film material and each clip has 58 frames.

The proposed advanced 4:4:4 profiles were implemented in the JVT Reference software JM9.6. Both intra-only and IBBP coding structure were used in the tests. The quantization parameter was set at 6, 12, 18, 24, 30, and 42 for each of the R-D curves. The RD-optimized mode selection was used.

The proposed Advanced 4:4:4 Profile was also compared with the results that were done by running the reference software with the YUVFormat=0(4:0:0) on every individual input component. Three separate individual compressed bit counts were simply added together to get the total compressed bits for calculating the compressed bit rate.

Regarding JPEG2k, KaKadu V2.2.3 software was used in the tests. The test results were generated by using 5 levels of wavelet decompression with the 9/7-tap bi-orthogonal wavelet filter. There was only one tile per frame and the RD-Optimization for a given target rate was also used.

All of the PSNR measurements were done in the RGB domain. Average PSNR, defined as (PSNR(red)+PSNR(green)+PSNR(blue))/3, is used to compare the overall compression quality. This is mainly because the JPEG2k compressed data are computed using an unknown rate control algorithm provided by the software. For some cases, the RGB PSNR values are quite far apart from each other, especially when the JPEG2k color transform was used.

The compression comparison was performed as follows:
New1: the proposed Advanced 4:4:4 Profile with a single prediction mode.
New3: the proposed Advanced 4:4:4 Profile with three prediction modes.
RCT-OFF: RGB input with RCT=off.
RCT-ON: RGB input with RCT=on.
YCOCG: RGB to YCOCG conversion was done outside the codec. Then the converted YCOCG was used as the input to the JVT software.
R+G+B: Proposed method approximated by compressing the R, G, and B signals separately.
Y+CO+CG: Proposed method approximated by compressing the converted Y, CO, and CG signals separately.

J2k_RGB: The JPEG2k compression was done in the RGB domain. The JPEG2k color transform was turned off.

J2k_YUV: The JPEG2k compression was done in the YUV domain. The JPEG2k color transform was used.

According to the test results, an implementation in accordance with the principles of the present invention as configured in an embodiment, in general, is very similar to JPEG2k in terms of overall compression efficiency. In some cases, it is even slightly better.

Further, an implementation in accordance with the principles of the present invention as configured in an embodiment, provides significantly greater performance (compression) than the current High 4:4:4 Profile for quality above 40 dB (PSNR). Specifically, New1-YCOCG or New3-YCOCG is better than YCOCG and RCT-ON; New1-RGB or New3-RGB is better than RCT-OFF. At a PSNR equal to and greater than 45 dB (PSNR), the average improvement in the average PSNR is more than 1.5 dB. In the last example, the improvement can be translated to more than 25% bit savings at a PSNR equal to 45 dB.

According to the test results, it seems that color transforms will help the coding performance when the content is more color saturated, such as TP, RT. That is, if the color is neutral and less saturated, coding in the RGB domain might be the right choice. The above observation is independent from what color transform is used.

Comparing the results of New1-YCOCG or New3-YCOCG and JPEG-2k_YUV, it has been observed that the performance of a specific color transform in terms of improving coding efficiency is very content dependent. No single color transform is always the best. Therefore, our data confirmed that having a color transform, such as RCT, inside the encoding (or decoding) loop might not be a good idea. Instead, performing the color transform, if it is necessary, outside the encoder/decoder could make the entire compression system provide a better and more robust performance.

Comparing YCOCG with RCT-ON, the test results do not show any coding efficiency improvement from RCT. In addition, it should be noted that running the reference software with the RCT turned on significantly increased the coding time. The running time was more than 2.5 times longer.

A description will now be given regarding syntax and semantics changes in accordance with the principles of the present invention as configured in an embodiment.

Turning to FIG. 12, a table for H.264 sequence parameter syntax is indicated generally by the reference numeral 1200. Changes to the syntax in accordance with the principles of the present invention as configured in an embodiment, are indicated by italic text.

Turning to FIG. 13, a table for H.264 residual data syntax is indicated generally by the reference numeral 1300. Additions/changes to the syntax in accordance with the principles of the present invention as configured in an embodiment, are indicated by italic text. In the table 1300, the luma section in the residual data header along with some necessary text modifications are repeated twice to support the luma1 and luma2, respectively.

As noted above, the above described first combined embodiment was evaluated and tested by implementing the present principles in the JVT reference software JM9.6. The test results marked with New1-RGB or New1-YCOCG represent the first combined embodiment.

As noted above, in accordance with the principles of the present invention as configured in an embodiment, a set (or subset) of three (3) restricted spatial predictors is utilized for the component channels (e.g., RGB, YUV, YCrCb formats, and so forth) instead of a single spatial prediction mode. Moreover, as noted above, this embodiment may be combined with other embodiments described herein, such as, e.g., the use of only the luma coding algorithm to code all three component channels of content and/or the use of color transformation as a pre-processing step.

A description will now be given regarding the above described second combined embodiment involving the use of a set (or subset) of three (3) restricted spatial predictors for the color components, the use of only the luma coding algorithm to code all three color components, and the use of color transformation as a pre-processing step (i.e., no RCT within the compression loop). Some variations of this embodiment will also be described there with.

Figure 14:
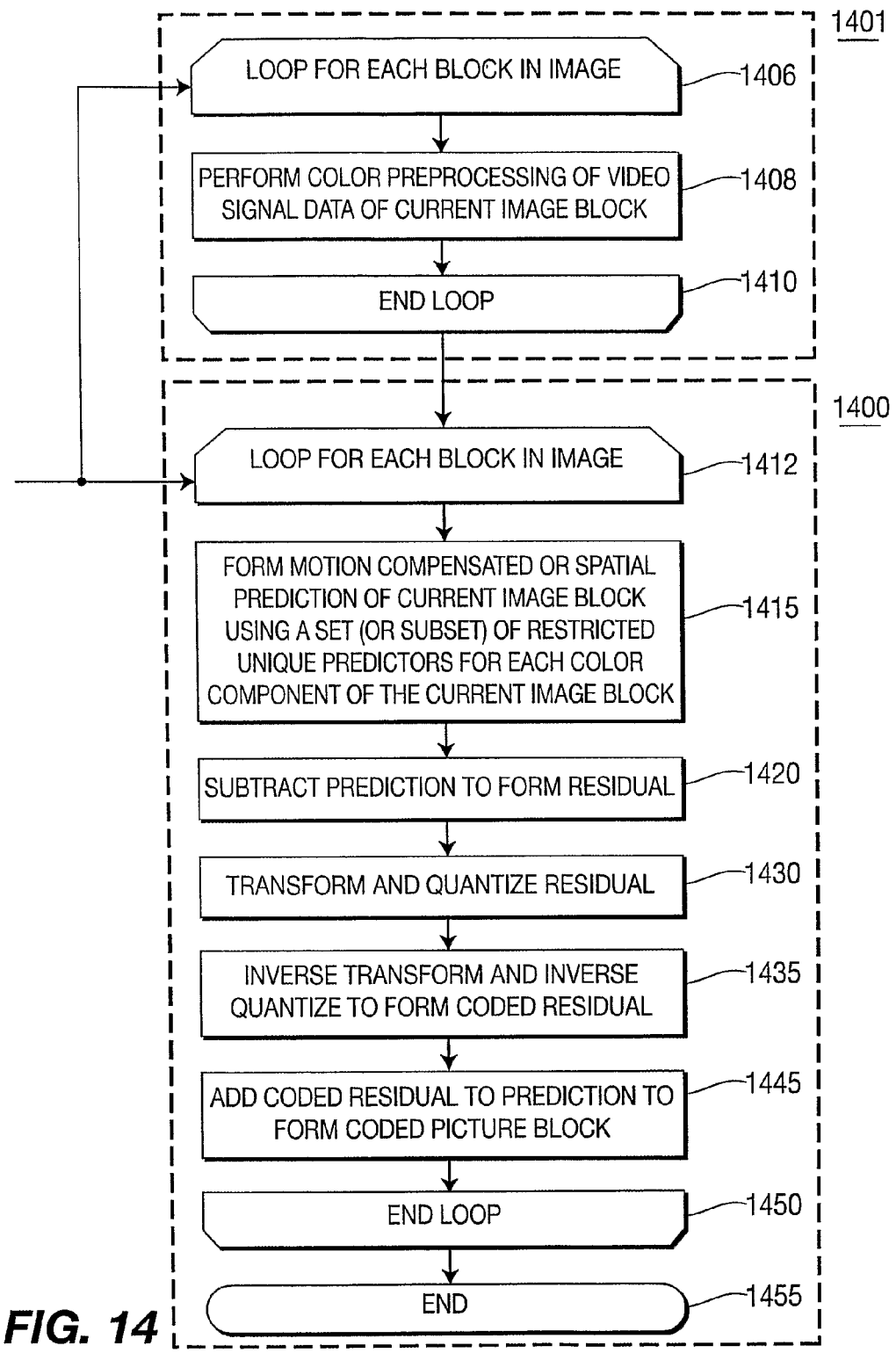
FIG. 14 is a flow diagram illustrating an exemplary video encoding process with a pre-encoding, color transform block, in accordance with the present principles.

Turning to FIG. 14, an exemplary video encoding process with a pre-encoding, color transform step are indicated generally by the reference numerals 1400 and 1401, respectively.

It is to be appreciated that the pre-encoding, color transform block 1401 includes blocks 1406, 1408, and 1410. Moreover, it is to be appreciated that the pre-encoding, color transform block 1401 is optional and, thus, may be omitted in some embodiments of the present invention.

The pre-encoding, color transform block 1401 includes a loop limit block 1406 that begins a loop for each block in an image, and passes control to a function block 1408. The function block 1408 performs color pre-processing of the video signal data of the current image block, and passes control to a loop limit block 1410. The loop limit block 1410 ends the loop. Moreover, the loop limit block 1410 passes control to a loop limit block 1412, the latter being included in the video encoding process 1400.

The loop limit block 1412 begins a loop for each block in the image, and passes control to a function block 1415. The function block 1415 forms a motion compensated or spatial prediction of the current image block using a common predictor for each color component of the current image block, and passes control to a function block 1420. The function block 1420 subtracts the motion compensated or spatial prediction from the current image block to form a prediction residual, and passes control to a function block 1430. The function block 1430 transforms and quantizes the prediction residual, and passes control to a function block 1435. The function block 1435 inverse transforms and quantizes the prediction residual to form a coded prediction residual, and passes control to a function block 1445. The function block 1445 adds the coded residual to the prediction to form a coded picture block, and passes control to an end loop block 1450. The end loop block 1450 ends the loop and passes control to an end block 1455.

Figure 15:
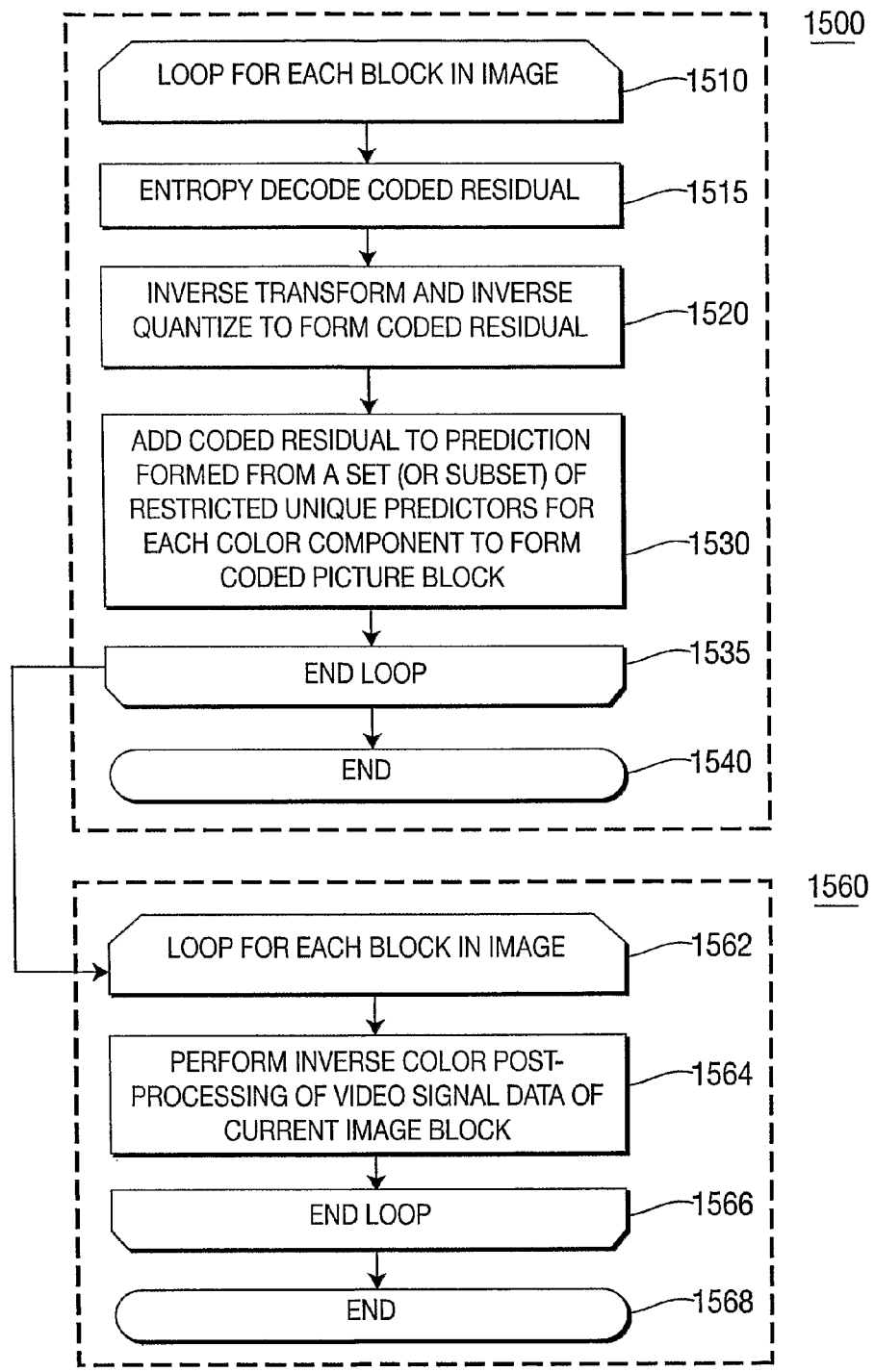
FIG. 15 is a flow diagram illustrating an exemplary video decoding process with a post-decoding, inverse color transform step block, in accordance with the present principles.

Turning to FIG. 15, an exemplary video decoding process with a post-decoding, inverse color transform step are indicated generally by the reference numerals 1500 and 1560, respectively.

It is to be appreciated that the post-decoding, inverse color transform block 1560 includes blocks 1562, 1564, 1566, and 1568. Moreover, it is to be appreciated that the post-decoding, inverse color transform block 1560 is optional and, thus, may be omitted in some embodiments of the present invention.

The decoding process 1500 includes a loop limit block 1510 that begins a loop for a current block in an image, and passes control to a function block 1515. The function block 1515 entropy decodes the coded residual, and passes control to a function block 1520. The function block 1520 inverse transforms and quantizes the decoded residual to form a coded residual, and passes control to a function block 1530. The function block 1530 adds the coded residual to the prediction formed from a common predictor for each color component to form a coded picture block, and passes control to a loop limit block 1535. The loop limit block 1535 ends the loop and passes control to an end block 1540.

In some embodiments, the loop limit block 1535 optionally passes control to the post-decoding, inverse color transform block 1560, in particular, the loop limit block 1562 included in the post-decoding, inverse color transform block 1560. The loop limit block 1562 begins a loop for each block in an image, and passes control to a function block 1564. The function block 1564 performs an inverse color post-processing of the video signal data of the current image block, and passes control to a loop limit block 1566. The loop limit block 1566 ends the loop, and passes control to an end block 1568.

As noted above, a new profile (profile_idc=166) for the Advanced 4:4:4 Profile is disclosed. This new profile may also be used for the second combined embodiment, with corresponding semantic and syntax changes as described herein below for the second combined embodiment. This new profile_idc is added in the Sequence Parameter Set and will be mainly used in the subsequent headers to indicate that the input format is 4:4:4 and all three input channels are coded similarly as luma.

To minimize the necessary changes to the H.264 standard, no new macroblock type is disclosed for the Advanced 4:4:4 Profile. Instead, all of the macroblock types along with the associated coding parameters listed in Table 7-11, Table 7-13, and Table 7-14 of the H.264 standard are still valid. For the case of intra macroblocks, all three input channels, luma, Cr, and Cb, will be encoded based on the MbPartPredMode defined in Table 7-11 of the H.264 standard. For example, an Intra_4×4 macroblock in the Advanced 4:4:4 Profile means every input component channel may be encoded by using all of the 9 possible prediction modes given in Table 8-2 of the H.264 standard. For reference, in the current High 4:4:4 Profile, two of the channels for an Intra_4×4 macroblock will be treated as chroma and only one of the 4 possible intra prediction mode in Table 8-5 of the H.264 standard will be used. For the B and P macroblocks, the changes made for the Advanced 4:4:4 Profile occur at the interpolation process for the calculation of the reference pixel value at the fractional pixel location. Here, the procedure described in Section 8.4.2.2.1 of the H.264 standard, Luma sample interpolation process, will be applied for luma, Cr, and Cb. Again for reference, the current High 4:4:4 Profile uses Section 8.4.2.2.2 of the H.264 standard, Chroma sample interpolation process, for two of the input channels.

In the case when the CABAC is chosen as the entropy coding mode, two separate sets of context models identical to those currently defined for luma will be created for Cr and Cb. They will also be updated independently during the course of encoding.

Finally, in the embodiment, since there is no RCT block in the coding loop, the ResidueColorTransformFlag is removed from the sequence parameter set in the Advanced 4:4:4 Profile.

Up to this point, most syntax changes occur in the residue data as shown in FIG. 13, where the original syntax for luma are repeated twice to support Cr and Cb in the proposed Advanced 4:4:4 profiles.

Regarding the H.264 macroblock layer table (not shown), semantic changes to the corresponding syntax include the following:

coded_block_pattern (Add). When chroma_format_idc is equal to 3 and coded_block_pattern is present, CodedBlockPatternChroma shall be set to 0. In addition, CodedBlockPatternLuma specifies, for each of the twelve 8×8 luma, Cb, and Cr blocks of the macroblock, one of the following cases: (1) All transform coefficient levels of the twelve 4×4 luma blocks in the 8×8 luma, 8×8 Cb and 8×8 Cr blocks are equal to zero; (2) One or more transform coefficient levels of one or more of the 4×4 luma blocks in the 8×8 luma, 8×8 Cb, and 8×8 Cr blocks shall be non-zero valued.

A description will now be given regarding spatial prediction mode selection for the intra blocks in accordance with the second combined embodiment (or the sole embodiment relating to the use of the set (or subset) of three restricted spatial predictors).

For each component to choose its best MbPartPredMode and the subsequent best spatial prediction mode independently, as in the case while encoding each input channel separately, some new intra block types may be added to Table 7-11 of the H.264 standard. As a result, a large amount of changes to the H.264 standard will be made. In an embodiment relating to the second combined embodiment, the current mb_types remain unchanged and an alternative solution is provided. In the embodiment, the three input channels are restricted to be encoded with the same MbPartPredMode or macroblock type. Then, a small amount of new elements are added into the Macroblock Prediction Syntax to support three separate prediction modes. Therefore, each component can still theoretically choose its best spatial prediction mode independently in order to minimize the prediction error for each component channel. For example, assuming an Intra_4×4 macroblock is chosen as the mb_type, luma, Cr, or Cb could still find its own best spatial prediction mode in Table 8-2 in Section 8.3.1.1 of the H.264 standard such as, e.g., Intra_4×4_Vertical for luma, Intra_4_4_Horizontal for Cr, and Intra_4×4_Diagonal_Down_Left for Cb.

Another approach, relating to the first combined embodiment described above, is to constrain all three input channels to share the same prediction mode. This can be done by using the prediction information that is currently carried by the existing syntax elements, such as prev_intra4×4_pre_mode_flag, rem_intra4×4_pred_mode, pre_intra8×8_pred_mode_flag, and rem_intra8×8_pred_mode, in the Macroblock Prediction syntax. This option will result in less change to the H.264 standard and some slight loss of the coding efficiency as well.

Based on the test results, using three prediction modes could improve the overall coding performance by about 0.2 dB over the first combined embodiment.

Turning to FIG. 16, a table for H.264 macroblock prediction syntax is indicated generally by the reference numeral 1700. For reference, the modified Macroblock Prediction Syntax to support using the three prediction modes is listed below, where:

prev_intra4×4_pred_mode_flag0 and rem_intra4×4 pred_mode0 are for luma;
prev_intra4×4_pred_mode_flag1 and rem_intra4×4_pred_mode1 are for Cr;
prev_intra4×4_pred_mode_flag2 and rem_intra4×4_pred_mode2 are for Cb;

A description will now be given regarding simulation results performed in accordance with the principles of the present invention as configured in an embodiment, for the second combined embodiment.

All JVT/FRExt test sequences described in JVT-J042, Film-Originated Test Sequence, JVT-J039 (Viper). They are all 4:4:4 10-bit materials and each clip has 58 frames.

The proposed algorithm was implemented in the JVT Reference software JM9.6 and the modified software was used in the tests. Both Intra-only and IBRrBP were tested. Here, "Br" means the recorded B pictures. The intra-only case was done for all of the sequences with the quantization parameter equal to 6, 12, 18, 24, 30, 36 and 42. Due to the large amount of time involved in the simulation, the IBRrBP GOP structure was only done for the film clips with a quantization parameter equal to 12, 18, 24, 30 and 36. According to the discussion in the 4:4:4 AHG, the following key parameters were used in the tests:

SymbolMode=1
    RDOptimization=1
    ScalingMatrixPresentFlag=0
    OffsetMatrixPresentFlag=1
    QoffsetMatrixFile="q_offset.cfg"
    AdaptiveRounding=1
    AdaptRndPeriod=1
    AdaptRndChroma=1
    AdaptRndWFactorX=8
    SearchRange=64
    UseFME=1

Regarding JPEG2k, KaKadu V2.2.3 software was used in the tests. The test results were generated by using 5 levels of wavelet decompression with the 9/7-tap bi-orthogonal wavelet filter. There was only one tile per frame and the RD-Optimization for a given target rate was also used.

The PSNR measurements were primarily calculated in the original color domain of the source contents, which is RGB for the clips described above. Average PSNR, defined as (PSNR(red)+PSNR(green)+PSNR(blue))/3, is used to compare the overall compression quality.

The compression comparison was performed as follows:

New1: the proposed Advanced 4:4:4 Profile with a single prediction mode.

New3: the proposed Advanced 4:4:4 Profile with three prediction modes.

RCT-OFF: RGB input with RCT=off.

RCT-ON: RGB input with RCT=on.

YCOCG: RGB to YCOCG conversion was done outside the codec. Then the converted YCOCG was used as the input to the JVT software.

R+G+B: Proposed method approximated by compressing the R, G, and B signals separately.

Y+CO+CG: Proposed method approximated by compressing the converted Y, CO, and CG signals separately.

JPEG2k_RGB: The JPEG2k compression was done in the RGB domain. The JPEG2k color transform was turned off.

JPEG2k_YUV: The JPEG2k compression was done in the YUV domain. The JPEG2k color transform was used.

For the Intra-Only case, the proposed Advanced 4:4:4 Profile in accordance with the present principles is very similar to JPEK2k in terms of overall compression efficiency. In some cases, it is even slightly better.

The approach in accordance with the principles of the present invention, is clearly better than the current High 4:4:4 Profile. At a PSNR equal to and greater than 45 dB (PSNR), the average improvement in the average PSNR is more than 1.5 dB. In some case, the improvement can be translated to more than 25% bit savings at a PSNR equal to 45 dB.

Even with the same block type, using three prediction modes is slightly better than a single one. However, more syntax and semantic changes may be utilized.

A description will now be given of some of the many attendant advantages/features provided by the principles of embodiments of the present invention.

The test results demonstrate that the proposed Advanced 4:4:4 Profile, utilizing the improvements corresponding to the principles of the present invention, delivers improved performance when compared to the current High 4:4:4 Profile. The performance gain is significant. In addition, moving the color transform outside the codec will make the architecture of the codec consistent among all of the color formats. As a result, it will make the implementation easier and reduce the cost. It will also make the codec more robust in terms of selecting the optimum color transform for achieving better coding efficiency. Also, the proposed approach does not add any new coding tools and requires only some slight changes to the syntax and semantics.

Thus, in accordance with the principles of the present invention as configured in an embodiment, a method and apparatus are provided for video encoding and decoding. Modifications to the existing H.264 standard are provided which improve performance beyond that currently achievable. Moreover, performance is improved even beyond JPEG-2000 for high quality applications. In accordance with the principles of the present invention as configured in an embodiment, significant 4:4:4 coding performance improvements in the H.264 standard can be achieved by using the luma coding algorithm to code all of the three color components of 4:4:4 content. That is, no new tools are necessary for the luma (or chroma, which is not used) compression algorithm. Instead, the existing luma coding tools are utilized. Further, syntax and semantic changes to the current 4:4:4 profile may be implemented in accordance with the present principles to support the luma coding of all three component channels. In tests conducted in accordance with an embodiment of the present invention, when the source content has lots of spatial textures and edges, the spatial prediction tools used in luma clearly exhibited their superior performance to those used in chroma. For some of the test sequences, when every color component was encoded as luma, more than a 30% bit reduction was observed at a compressed quality greater than or equal to 45 dB(Average PSNR).

It is to be appreciated that while the present invention has primarily been described herein with respect to video signal data sampled using the 4:4:4 format of the H.264 standard, the present invention may also be readily implemented with respect to video signal data sampled using other formats (e.g., the 4:2:0 format and/or the 4:2:2 format) of the H.264 standard, as well as other video compression standards. Given the teachings of the present invention provided herein, these and other variations of the present invention may also be readily implemented by one of ordinary skill in this and related arts, while maintaining the scope of the present invention.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus for encoding video signal data for an image block, the apparatus comprising an encoder for encoding color components of the video signal data without applying a residual color transform thereto, said encoder encodes all of the color components of the video signal data using a common color component predictor wherein sampling of the video signal data corresponds to a 4:4:4 format.

2. The apparatus of claim 1, further comprising a pre-encoder, color transform module, in signal communication with said encoder, for selectively performing a color transform on color components of the video signal data prior to encoding of the color components by said encoder.

3. The apparatus of claim 2, wherein the color transform performed by said pre-encoder color transform module is a non-residual color transform.

4. The apparatus of claim 2, wherein said pre-encoder color transform module performs the color transform on source images corresponding to the video signal data.

5. The apparatus of claim 2, wherein said pre-encoder, color transform module provides transformed color components of the video signal data to said encoder in the RGB format or any non-RGB format.

6. The apparatus of claim 1, wherein the common predictor is a luma predictor used for both luma and chroma components of the video signal data.

7. The apparatus of claim 1, wherein said encoder uses a common spatial prediction mode for all of the color components of the video signal data.

8. The apparatus of claim 7, wherein the common spatial prediction mode is set by prev_intra8×8_pred_mode_flag, rem_intra8×8_pred_mode, prev_intra4×4_pred_mode_flag, and rem_intra4×4_pred_mode parameters of the International Telecommunication Union, Telecommunication Sector H.264 standard.

9. The apparatus of claim 1, wherein said encoder uses common interpolation filters for B and P frames for all of the color components of the video signal data.

10. A method for encoding video signal data for an image block, the method comprising encoding color components of the video signal data without applying a residual color transform, said encoding step encodes all of the color components of the video signal data using a common color component predictor, and wherein said video signal data sampling corresponds to a 4:4:4 format.

11. The method of claim 10, further comprising a pre-encoding step for selectively performing a color transform on color components of the video signal data.

12. The method of claim 11, wherein the color transform performed by said pre-encoding step is a non-residual color transform.

13. The method of claim 11, wherein said pre-encoding step performs the color transform on source images corresponding to the video signal data.

14. The method of claim 11, wherein said pre-encoding step provides transformed color components of the video signal data for said encoding step in the RGB format or any non-RGB format.

15. The method of claim 10, wherein the common predictor is a luma predictor used for both luma and chroma components of the video signal data.

16. The method of claim 10, wherein said encoding step uses a common spatial prediction mode for all of the color components of the video signal data.

17. The method of claim 10, wherein the common spatial prediction mode is set by prev_intra8×8_pred_mode_flag, rem_intra8×8_pred_mode, prev_intra4×4_pred_mode_flag, and rem_intra4×4_pred_mode parameters of the International Telecommunication Union, Telecommunication Sector H.264 standard.

18. The method of claim 10, wherein said encoding step uses common interpolation filters for B and P frames for all of the color components of the video signal data.

* * * * *